(12) United States Patent
Hofmann et al.

(10) Patent No.: US 9,610,650 B2
(45) Date of Patent: Apr. 4, 2017

(54) SYSTEMS AND METHODS FOR FABRICATING STRUCTURES INCLUDING METALLIC GLASS-BASED MATERIALS USING ULTRASONIC WELDING

(71) Applicant: California Institute of Technology, Pasadena, CA (US)

(72) Inventors: Douglas C. Hofmann, Altadena, CA (US); Scott N. Roberts, Altadena, CA (US)

(73) Assignee: California Institute of Technology, Pasadena, CA (US)

(*) Notice: Subject to any disclaimer, the term of this patent is extended or adjusted under 35 U.S.C. 154(b) by 0 days.

(21) Appl. No.: 14/259,608

(22) Filed: Apr. 23, 2014

(65) Prior Publication Data

US 2014/0312098 A1    Oct. 23, 2014

Related U.S. Application Data

(60) Provisional application No. 61/814,998, filed on Apr. 23, 2013.

(51) Int. Cl.
| | | |
|---|---|---|
| *B23K 20/00* | (2006.01) | |
| *B23K 20/10* | (2006.01) | |
| *B23K 20/22* | (2006.01) | |

(52) U.S. Cl.
CPC ............ *B23K 20/22* (2013.01); *B23K 20/10* (2013.01); *B23K 20/103* (2013.01)

(58) Field of Classification Search
CPC .... B23K 20/10; B23K 20/1205; B23K 20/22; C22C 45/00

USPC ............ 228/110.1, 101, 111, 112.1; 29/428; 148/403, 561
See application file for complete search history.

(56) References Cited

U.S. PATENT DOCUMENTS

| | | | |
|---|---|---|---|
| 3,529,457 | A | 9/1970 | Bowers |
| 3,986,412 | A | 10/1976 | Farley et al. |
| RE29,989 | E | 5/1979 | Polk |
| 4,173,393 | A | 11/1979 | Maurer |
| 4,202,404 | A | 5/1980 | Carlson |
| 4,711,795 | A | 12/1987 | Takeuchi et al. |
| 4,810,314 | A | 3/1989 | Henderson et al. |

(Continued)

FOREIGN PATENT DOCUMENTS

| | | |
|---|---|---|
| CN | 102563006 A | 7/2012 |
| DE | 20100062089 A1 | 5/2012 |

(Continued)

OTHER PUBLICATIONS

US 9,285,027, 03/2016, Hofmann et al. (withdrawn)

(Continued)

*Primary Examiner* — Erin Saad
(74) *Attorney, Agent, or Firm* — KPPB LLP

(57) ABSTRACT

Systems and methods in accordance with embodiments of the invention fabricate objects including metallic glass-based materials using ultrasonic welding. In one embodiment, a method of fabricating an object that includes a metallic glass-based material includes: ultrasonically welding at least one ribbon to a surface; where at least one ribbon that is ultrasonically welded to a surface has a thickness of less than approximately 150 μm; and where at least one ribbon that is ultrasonically welded to a surface includes a metallic glass-based material.

26 Claims, 14 Drawing Sheets

(56) References Cited

U.S. PATENT DOCUMENTS

| | | |
|---|---|---|
| 4,812,150 A | 3/1989 | Scott |
| 4,823,638 A | 4/1989 | Ishikawa et al. |
| 4,851,296 A | 7/1989 | Tenhover et al. |
| 4,883,632 A | 11/1989 | Goto et al. |
| 5,168,918 A | 12/1992 | Okuda et al. |
| 5,288,344 A | 2/1994 | Peker et al. |
| 5,310,432 A | 5/1994 | Yamanaka et al. |
| 5,772,803 A | 6/1998 | Peker et al. |
| 6,162,130 A | 12/2000 | Masumoto et al. |
| 6,273,322 B1* | 8/2001 | Yamamoto ............ B23K 20/10 228/110.1 |
| 6,620,264 B2 | 9/2003 | Kundig et al. |
| 6,652,679 B1 | 11/2003 | Inoue et al. |
| 6,771,490 B2 | 8/2004 | Peker et al. |
| 6,843,496 B2 | 1/2005 | Peker et al. |
| 6,887,586 B2 | 5/2005 | Peker et al. |
| 7,052,561 B2 | 5/2006 | Lu et al. |
| 7,073,560 B2 | 7/2006 | Kang et al. |
| 7,075,209 B2 | 7/2006 | Howell et al. |
| 7,357,731 B2 | 4/2008 | Johnson et al. |
| 7,360,419 B2 | 4/2008 | French et al. |
| 7,497,981 B2 | 3/2009 | Graham et al. |
| 7,500,987 B2 | 3/2009 | Bassler et al. |
| 7,552,664 B2 | 6/2009 | Bulatowicz |
| 7,862,323 B2 | 1/2011 | Micarelli et al. |
| 7,896,982 B2 | 3/2011 | Johnson et al. |
| 8,400,721 B2 | 3/2013 | Bertele et al. |
| 8,485,245 B1 | 7/2013 | Prest et al. |
| 8,596,106 B2 | 12/2013 | Tang et al. |
| 8,613,815 B2 | 12/2013 | Johnson et al. |
| 8,986,469 B2 | 3/2015 | Khalifa et al. |
| 9,057,120 B2 | 6/2015 | Pham et al. |
| 9,328,813 B2 | 5/2016 | Hofmann et al. |
| 2002/0053375 A1* | 5/2002 | Hays ................ C22C 33/003 148/561 |
| 2002/0100573 A1 | 8/2002 | Inoue et al. |
| 2002/0184766 A1 | 12/2002 | Kobayashi et al. |
| 2003/0062811 A1 | 4/2003 | Peker et al. |
| 2004/0103536 A1 | 6/2004 | Kobayashi et al. |
| 2004/0103537 A1 | 6/2004 | Kobayashi et al. |
| 2004/0154701 A1 | 8/2004 | Lu et al. |
| 2005/0034792 A1 | 2/2005 | Lu et al. |
| 2005/0127139 A1* | 6/2005 | Slattery ............... B23K 20/12 228/112.1 |
| 2006/0156785 A1 | 7/2006 | Mankame |
| 2007/0034304 A1 | 2/2007 | Inoue et al. |
| 2007/0226979 A1 | 10/2007 | Paton et al. |
| 2009/0114317 A1 | 5/2009 | Collier et al. |
| 2009/0194205 A1 | 8/2009 | Loffler et al. |
| 2010/0313704 A1 | 12/2010 | Wang et al. |
| 2011/0048587 A1 | 3/2011 | Vecchio et al. |
| 2011/0302783 A1 | 12/2011 | Nagata et al. |
| 2012/0067100 A1 | 3/2012 | Stefansson et al. |
| 2012/0073710 A1 | 3/2012 | Kim et al. |
| 2012/0077052 A1* | 3/2012 | Demetriou ............ B32B 3/266 428/593 |
| 2013/0112321 A1 | 5/2013 | Poole et al. |
| 2013/0133787 A1 | 5/2013 | Kim |
| 2013/0139964 A1 | 6/2013 | Hofmann et al. |
| 2013/0309121 A1 | 11/2013 | Prest et al. |
| 2013/0333814 A1 | 12/2013 | Fleury et al. |
| 2014/0020794 A1 | 1/2014 | Hofmann et al. |
| 2014/0083640 A1 | 3/2014 | Waniuk et al. |
| 2014/0093674 A1 | 4/2014 | Hofmann et al. |
| 2014/0141164 A1 | 5/2014 | Hofmann |
| 2014/0202595 A1 | 7/2014 | Hofmann |
| 2014/0213384 A1 | 7/2014 | Johnson et al. |
| 2014/0224050 A1 | 8/2014 | Hofmann et al. |
| 2014/0227125 A1 | 8/2014 | Hofmann |
| 2014/0246809 A1 | 9/2014 | Hofmann |
| 2014/0342179 A1 | 11/2014 | Hofmann et al. |
| 2015/0314566 A1 | 1/2015 | Mattlin et al. |
| 2015/0047463 A1 | 2/2015 | Hofmann et al. |
| 2015/0068648 A1 | 3/2015 | Schroers et al. |
| 2015/0075744 A1 | 3/2015 | Hofmann et al. |
| 2016/0186850 A1 | 6/2016 | Hofmann et al. |
| 2016/0258522 A1 | 9/2016 | Hofmann et al. |

FOREIGN PATENT DOCUMENTS

| | | |
|---|---|---|
| EP | 0127366 A1 | 5/1984 |
| EP | 1063312 A1 | 12/2000 |
| EP | 1138798 A1 | 10/2001 |
| EP | 1696153 A1 | 8/2006 |
| EP | 1404884 B1 | 7/2007 |
| EP | 1944138 A2 | 7/2008 |
| JP | 61276762 A | 12/1986 |
| JP | 2002045960 A | 2/2002 |
| JP | 2004353053 A | 12/2004 |
| WO | 2007038882 A1 | 4/2007 |
| WO | 2011159596 A1 | 12/2011 |
| WO | 2014004704 A1 | 1/2014 |
| WO | 2014058498 A3 | 4/2014 |
| WO | 2015042437 A1 | 3/2015 |
| WO | 2015156797 A1 | 10/2015 |

OTHER PUBLICATIONS

Hu et al., "Crystallization Kinetics of the Cu47.5Zr74.5Al5 Bulk Metallic Glass under Continuous and Iso-thermal heating", App. Mech. and Materials, vols. 99-100, 2011, p. 1052-1058.

Song et al., "Strategy for pinpointing the formation of B2 CuZr in metastable CuZr-based shape memory alloys", Acta Materialia 59, 2011, 6620-6630.

Wu et al., "Formation of Cu—Zr—Al bulk metallic glass composites with improved tensile properties", Acta Materialia 59, 2011, pp. 2928-2936.

Fu et al., "Sliding behavior of metallic glass Part I. Experimental investigations", Wear, 2001, vol. 250, pp. 409-419.

Kozachkov et al., "Effect of cooling rate on the volume fraction of B2 phases in a CuZrAlCo metallic glass matrix composite", Intermetallics, 2013, vol. 39, pp. 89-93.

International Search Report and Written Opinion for International Application No. PCT/US13/050614, Search Completed May 7, 2014, Mailed May 7, 2014, 12 pgs.

"Harmonic Drive AG", website, printed from http://harmoncdrive.aero/?idcat=471, Feb. 20, 2014, 2 pgs.

"Harmonic Drive Polymer GmbH", printed Feb. 20, 2014 from http://vvww.harmonicdrive.de/English/the-company/subsidiaries/harmonic-drive-polymer-gmbh.html, 1 pg.

International Search Report and Written Opinion for International Application PCT/US2013/047950, completed Oct. 8, 2013, 9 pgs.

"Introduction to Thermal Spray Processing", ASM International, Handbook of Thermal Spray Technology (#06994G), 2004, 12 pgs.

Abrosimova et al., "Crystalline layer on the surface of Zr-based bulk metallic glasses", Journal of Non-Crystalline solids, 2001, vol. 288, pp. 121-126.

An et al., "Synthesis of single-component metallic glasses by thermal spray of nanodroplets on amorphous substrates", Applied Physics Letters, 2012, vol. 100, pp. 041909-1-041909-4.

Anstis et al., "A Critical Evaluation of Indentation Techniques for Measuring Fracture Toughness: I, Direct Crack Measurements", Journal of American Ceramic Society, Sep. 1981, vol. 64, No. 8, pp. 533-538.

Ashby et al., "Metallic glasses of structural materials", Scripta Materialia, 2006, vol. 54, pp. 321-326.

Bakkal, "Sliding tribological characteristics of Zr-based bulk metallic glass under lubricated conditions", Intermetallics, 2010, vol. 18, pp. 1251-1253.

Bardt et al., "Micromolding three-dimensional amorphous metal structures", J. Mater. Res, Feb. 2007, vol. 22, No. 2, pp. 339-343.

Basu et al., "Laser surface coating of Fe—Cr—Mo—Y—B—C bulk metallic glass composition on AISI 4140 steel", Surface & Coatings Technology, 2008, vol. 202, pp. 2623-2631.

Branagan et al., "Wear Resistant Amorphous and Nanocomposite Steel Coatings", Met. Mater. Trans. A, 2001, 32A; Idaho National Engineering and Environmental Laboratory, DOI 10.1007/s11661-001-0051-8, 15 pgs.

(56) References Cited

OTHER PUBLICATIONS

Cadney et al., "Cold gas dynamic spraying as a method for freeforming and joining materials", Science Direct, Surface & Coatings Technology, 202, 2008, pp. 2801-2806.

Calin et al., "Improved mechanical behavior of Cu—Ti-based bulk metallic glass by in situ formation of nanoscale precipitates", Scripta Materialia, 2003, vol. 48, pp. 653-658.

Chen et al., "Elastic Constants, Hardness and Their Implications to Flow Properties of Metallic Glasses", Journal of Non-crystalline Solids, 1975, vol. 18, pp. 157-171.

Chen et al., "Influence of laser surface melting on glass formation and tribological behaviors of Zr55Al10Ni5Cu30 alloy", J. Mater Res. Oct. 28, 2011, vol. 26, No. 20, pp. 2642-2652.

Cheng, J. B. "Characterization of mechanical properties of FeCrBSiMnNbY metallic glass coatings", J Mater Sci., 2009, vol. 44, pp. 3356-3363, Apr. 16, 2009.

Choi et al., "Tribological behavior of the kinetic sprayed $Ni_{59}Ti_{16}Zr_{20}Si_{2}Sn_{3}$", Journal of Alloys and Compounds, 2007, vol. 434-435, pp. 64-67.

Conner et al., "Shear band spacing under bending of Zr-based metallic glass plates", Acta Materialia, 2004, vol. 52, pp. 2429-2434.

Conner et al., "Shear bands and cracking of metallic glass plates in bending", Journal of Applied Physics, Jul. 15, 2003, vol. 94, No. 2, pp. 904-911.

Dai et al., "A new centimeter-diameter Cu-based bulk metallic glass", Scripta Materialia, 2006, vol. 54, pp. 1403-1408.

Davis, "Hardness/Strength Ratio of Metallic Glasses", Scripta Metallurgica, 1975, vol. 9, pp. 431-436.

De Beer et al., "Surface Folds Make Tears and Chips", Physics, 2012, vol. 100, 3 pgs.

Dislich et al., "Amorphous and Crystalline Dip Coatings Obtained from Organometallic Solutions: Procedures, Chemical Processes and Products", Metallurgical and Protective Coatings, 1981, vol. 77, pp. 129-139.

Duan et al., "Lightweight Ti-based bulk metallic glasses excluding late transition metals", Scripta Materialia, 2008, vol. 58, pp. 465-468.

Duan et al., "Tribological properties of $Zr_{41.25}Ti_{13.75}Nb_{0}Cu_{12.5}Be_{22.5}$ bulk metallic glasses under different conditions", Journal of Alloys and Compounds, 2012, 528. pp. 74-78.

Fleury et al., "Tribological properties of bulk metallic glasses", Materials Science and Engineering, 2004, vol. A375-377, pp. 276-279.

Fornell et al., "Enhanced mechanical properties and in vitro corrosion behavior of amorphous and devitrified $Ti_{40}Zr_{10}Cu_{38}Pd_{12}$ metallic glass", Journal of the Mechanical Behavior of Biomedical Materials, 2011, vol. 4, pp. 1709-1717.

Ganesan et al. "Bonding behavior studies of cold sprayed copper coating on the PVC polymer substrate", Surface & Coatings Technology, 2012, vol. 207, pp. 262-269.

Garrett et al., "Effect of microalloying on the toughness of metallic glasses", Applied Physics Letter, 2012, vol. 101, 241913-1-241913-3.

Gleason Corporation, "Gear Product News", Introducing genesis, The Next Generation in Gear Technology, Apr. 2006, 52 pgs.

Gloriant, "Microhardness and abrasive wear resistance of metallic glasses and nanostructured composite materials", Journal of Non-Crystalline Solids, 2003, vol. 316, pp. 96-103.

Greer, "Partially or fully devitrified alloys for mechanical properties", Materials and Science and Engineering, 2001, vol. A304, pp. 68-72.

Hale, "Principles and Techniques for Designing Precision Machines", Ph.D. Thesis, Feb. 1999, 493 pgs.

Haruyama et al., "Volume and enthalpy relaxation in Zr55Cu30Ni5Al10 bulk metallic glass", Acta Materialia, 2010, vol. 59, pp. 1829-1836.

Hejwowski et al., "A comparative study of electrochemical properties of metallic glasses and weld overlay coatings", Vacuum 88 (2013) 118-123.

Hofmann, "Bulk Metallic Glasses and Their Composites: A Brief History of Diverging Fields", Journal of Materials, 2013, vol. 2013, 7 pgs.

Hofmann, "Shape Memory Bulk Metallic Glass Composites", Science, Sep. 10, 2010, vol. 329, pp. 1294-1295.

Hofmann et al., "Designing metallic glass matrix composites with high toughness and tensile ductility", Nature Letters, Feb. 28, 2008, vol. 451, pp. 1085-1090.

Hofmann et al., "Semi-solid Induction Forging of Metallic Glass Matrix Composites", JOM, Dec. 2009, vol. 61, No. 12, pp. 11-17, plus cover.

Hong et al., "Dry sliding tribological behavior of Zr-based bulk metallic glass", Trans. Nonferrous Met. Soc. China, 2012, vol. 22, pp. 585-589.

Hong et al., "Microstructural characteristics of high-velocity oxygen-fuel (HVOF) sprayed nickel-based alloy coating", Journal of Alloys and Compounds 581 (2013) pp. 398-403.

Huang et al., "Fretting wear behavior of bulk amorphous steel", Intermetallics, 2011, vol. 19, pp. 1385-1389.

Inoue et al., "Cobalt-based bulk glassy alloy with ultrahigh strength and soft magnetic properties", Nature Materials, Oct. 2003, vol. 2, pp. 661-663.

Inoue et al., "Preparation of 16 mm diameter Rod of Amorphous $Zr_{65}Al_{7.5}Ni_{10}Cu_{17.5}$ Alloy", Material Transactions, JIM, 1993, vol. 34, No. 12, pp. 1234-1237.

Ishida et al., "Wear resistivity of super-precision microgear made of Ni-based metallic glass", Materials Science and Engineering, 2007, vol. A449-451, pp. 149-154.

Jiang et al., "Tribological Studies of a Zr-Based Glass-Forming Alloy with Different States", Advanced Engineering Materials, 2009, vol. 1, No. 11, pp. 925-931.

Kahraman et al., "A Feasibility Study on Development of Dust Abrasion Resistant Gear Concepts for Lunar Vehicle Gearboxes", NASA Grant NNX07AN42G Final Report, Mar. 11, 2009, 77 pgs.

Kim, "Amorphous phase formation of Zr-based alloy coating by HVOF spraying process", Journal of Materials Science 36 (2001) pp. 49-54.

Kim et al. "Enhancement of metallic glass properties of Cu-based BMG coating by shroud plasma spraying", Science Direct, Surface & Coatings Technology 205 (2011) pp. 3020-3026.

Kim et al. "Oxidation and crystallization mechanisms in plasma-sprayed Cu-based bulk metallic glass coatings", Acta Materialia. 2010, vol. 58, pp. 952-962.

Kim et al., "Production of $Ni_{65}Cr_{15}P_{16}B_{4}$ Metallic Glass-Coated Bipolar Plate for Fuel Cell by High Velocity Oxy-Fuel (HVOF) Spray Coating Method", The Japan Institute of Metals, Materials Transactions, vol. 51, No. 9 (2010) pp. 1609-1613.

Kobayashi et al., "Fe-based metallic glass coatings produced by smart plasma spraying process", Materials Science and Engineering, 2008, vol. B148, pp. 110-113.

Kobayashi et al., "Mechanical property of Fe-base metallic glass coating formed by gas tunnel type plasma spraying", ScienceDirect, Surface & Coatings Technology (2007), 6 pgs.

Kong et al., "Effect of Flash Temperature on Tribological Properties of Bulk Metallic Glasses", Tribol. Lett., 2009, vol. 35, pp. 151-158.

Kumar et al., "Bulk Metallic Glass: The Smaller the Better", Advanced Materials, 2001, vol. 23, pp. 461-476.

Kwon et al., "Wear behavior of Fe-based bulk metallic glass composites", Journal of Alloys and Compounds, 2011, vol. 509S, pp. S105-S108.

Li et al., "Wear behavior of bulk $Zr_{41}Ti_{14}Cu_{12.5}Ni_{10}Be_{22.5}$ metallic glasses", J. Mater. Res., Aug. 2002, vol. 17, No. 8, pp. 1877-1880.

List et al. "Impact Conditions for Cold Spraying of Hard Metallic Glasses", Journal of Thermal Spray Technology, Jun. 2012, vol. 21, No. 3-4, pp. 531-540.

Liu, "Microstructure and properties of Fe-based amorphous metallic coating produced by high velocity axial plasma spraying", Science Direct, Journal of Alloys and Compounds 484 (2009) pp. 300-307.

Liu et al., "Influence of Heat Treatment on Microstructure and Sliding Wear of Thermally Sprayed Fe-Based Metallic Glass coatings", Tribol. Lett., 2012, vol. 46, pp. 131-138.

(56) References Cited

OTHER PUBLICATIONS

Liu et al., "Metallic glass coating on metals plate by adjusted explosive welding technique", Applied Surface Science, 2009, vol. 255, pp. 9343-9347.
Liu et al., "Sliding Tribological Characteristics of a Zr-based Bulk Metallic Glass Near the Glass Transition Temperature", Tribol. Lett. 2009, vol. 33, pp. 205-210.
Liu et al., "Wear behavior of a Zr-based bulk metallic glass and its composites", Journal of Alloys and Compounds, 2010, vol. 503, pp. 138-144.
Lupoi et al., "Deposition of metallic coatings on polymer surfaces using cold spray", Science Direct, Surface & Coatings Technology 205 (2010) pp. 2167-2173.
Ma et al., "Wear resistance of Zr-based bulk metallic glass applied in bearing rollers", Materials Science and Engineering, 2004, vol. A386, pp. 326-330.
Maddala et al., "Effect of notch toughness and hardness on sliding wear of $Cu_{50}Hf_{41.5}A_{18.5}$ bulk metallic glass", Scripta Materialia, 2011, vol. 65, pp. 630-633.
Ni, "High performance amorphous steel coating prepared by HVOF thermal spraying", Journal of Alloys and Compounds 467 (2009) pp. 163-167.
Parlar et al., "Sliding tribological characteristics of Zr-based bulk metallic glass", Intermetallics, 2008, vol. 16, pp. 34-41.
Pauly et al., "Modeling deformation behavior of Cu—Zr—Al bulk metallic glass matrix composites", Applied Physics Letters, 2009, vol. 95, pp. 101906-1-101906-3.
Ponnambalam et al., "Fe-based bulk metallic glasses with diameter thickness larger than one centimeter", J Mater Res, 2004, vol. 19; pp. 1320-1323.
Porter et al., "Incorporation of Amorphous Metals into MEMS for High Performance and Reliability", Rockwell Scientific Company, Final Report, Nov. 2003, 41 pgs.
Prakash et al., "Sliding wear behavior of some Fe-, Co-and Ni-based metallic glasses during rubbing against bearing steel", Tribology Letters, 2000, vol. 8, pp. 153-160.
Ramamurty et al., "Hardness and plastic deformation in a bulk metallic glass", Acta Materialia, 2005, vol. 53, pp. 705-717.
Revesz et al. "Microstructure and morphology of Cu—Zr—Ti coatings produced by thermal spray and treated by surface mechanical attrition", ScienceDirect, Journal of Alloys and Compounds 509S (2011) S482-S485.
Rigney et al., "The Evolution of Tribomaterial During Sliding: A Brief Introduction", Tribol. Lett, 2010, vol. 39, pp. 3-7.
Roberts et al., "Cryogenic Charpy impact testing of metallic glass matrix composites", Scripta Materialia, 2011, 4 pgs.
Schuh et al., "A survey of instrumented indentation studies on metallic glasses", J. Mater. Res., Jan. 2004, vol. 19, No. 1, pp. 46-57.
Segu et al., "Dry Sliding Tribological Properties of Fe-Based Bulk Metallic Glass", Tribol. Lett., 2012, vol. 47, pp. 131-138.
Shen et al., "Exceptionally high glass-forming ability of an FeCoCrMoCBY alloy", Applied Physics, 2005, vol. 86, pp. 151907-1-151907-3.
Sundaram et al., "Mesoscale Folding, Instability, and Disruption of Laminar Flow in Metal Surfaces", Physical Review Letters, Sep. 7, 2012, vol. 109, pp. 106001-1-106001-5.
Tam et al., "Abrasion resistance of Cu based bulk metallic glasses", Journal of Non-Crystalline Solids, 2004, vol. 347, pp. 268-272.
Tam et al., "Abrasive wear of $Cu_{60}Zr_{30}Ti_{10}$ bulk metallic glass", Materials Science and Engineering, 2004, vol. A384 pp. 138-142.
Tao et al., "Effect of rotational sliding velocity on surface friction and wear behavior in Zr-based bulk metallic glass", Journal of Alloys and Compounds, 2010, vol. 492, pp. L36-L39.
Tao et al., "Influence of isothermal annealing on the micro-hardness and friction property in CuZrAl bulk metallic glass", Advanced Materials Research, 2011, vols. 146-147, pp. 615-618.

Tobler et al., "Cryogenic Tensile, Fatigue, and Fracture Parameters for a Solution-Annealed 18 Percent Nickel Maraging Steel", Journal of Engineering Materials and Technology, Apr. 1978, vol. 100, pp. 189-194.
Wagner, "Mechanical Behavior of 18 Ni 200 Grade Maraging Steel at Cyrogenic Temperatures", J Aircraft, Oct. 1986, vol. 23, No. 10, pp. 744-749.
Wang et al., "Progress in studying the fatigue behavior of Zr-based bulk-metallic glasses and their composites", Intermetallics, 2009, vol. 17, pp. 579-590.
Wu et al., "Bulk Metallic Glass Composites with Transformation-Mediated Work-Hardening and Ductility", Adv. Mater., 2010, vol. 22, pp. 2770-2773.
Wikipedia, "Harmonic Drive", printed Feb. 20, 2014, 4 pgs.
Wu et al., "Effects of environment on the sliding tribological behaviors of Zr-based bulk metallic glass", Intermetallics, 2012, vol. 25, 115-125.
Yin et al. "Microstructure and mechanical properties of a spray-formed Ti-based metallic glass former alloy", ScienceDirect, Journal of Alloys and Compounds 512 (2012) 241-245.
Zachrisson et al., "Effect of Processing on Charpy impact toughness of metallic glass matrix composites", J. Mater. Res., May 28, 2011, vol. 26, No. 10, pp. 1260-1268.
Zhang et al., "Abrasive and corrosive behaviors of Cu—Zr—Al—Ag—Nb bulk metallic glasses", Journal of Physics: Conference Series, 2009, vol. 144, pp. 1-4.
Zhang et al., "Robust hydrophobic Fe-based amorphous coating by thermal spraying", Appl. Phys. Lett. 2012, vol. 101, pp. 121603-1-121603-4.
Zhang et al., "Wear behavior of a series of Zr-based bulk metallic glasses", Materials Science and Engineering, 2008, vol. A475, pp. 124-127.
Zhou et al., "Microstructure and Electrochemical Behavior of Fe-Based Amorphous Metallic Coatings Fabricated by Atmospheric Plasma Spraying", Journal of Thermal Spray Technology, Jan. 2011, vol. 20, No. 1-2, pp. 344-350.
Zhuo, "Spray formed Al-based amorphous matrix nanocomposite plate", ScienceDirect, Journal of Alloys and Compounds 509 (2011) L169-L173.
Abdeljawad, F. et al., Physical Review Letters, vol. 105, 205503, Sep. 17, 2010.
Cheng, J. L. et al., Intermetallics, vol. 18, Issue 12, Sep. 24, 2010, pp. 2425-2430.
Fan, C. et al., Applied Physics Letters, vol. 81, Issue 6, Aug. 5, 2002.
Ha, D. J. et al., Materials Science and Engineering: A, vol. 552, May 28, 2012, pp. 404-409.
Harmon, John S. et al., Physical Review Letters, vol. 99, 135502, Sep. 28, 2007.
Hays, C. C. et al., Physical Review Letters, vol. 84, 2901, Mar. 27, 2000.
Hofmann, D. C. et al., Proceedings of the National Academy of Science, vol. 105, Dec. 23, 2008, pp. 20136-20140.
Hofmann, D. C. et al., Material Science Forum, vol. 633-634, 2010, pp. 657-663.
Huang, Y. L. et al., Scripta Materialia, vol. 53, Mar. 29, 2005, pp. 93-97.
Kim, C. P. et al., Scripta Materialia, vol. 65, May 3, 2011, pp. 304-307.
Kuhn, U. et al. Materials Science and Engineering: A, vols. 375-377, 2004, pp. 322-326.
Kuhn, U. et al., Applied Physics Letters, vol. 80, No. 14, Apr. 8, 2002.
Launey, M. E. et al., Applied Physics Letters, vol. 94, 241910, 2009.
Lee, M. L. et al., Acta Materialia, vol. 52, Issue 14, Jun. 17, 2004, pp. 4121-4131.
Narayan, R. L. et al., Scripta Materialia, vol. 63, Issue 7, Jun. 9, 2010, pp. 768-771.
Oh, Y. S. et al., Acta Materialia, vol. 59, Issue 19, Sep. 23, 2011, pp. 7277-7286.
Pauly, S. et al., Nature Materials, vol. 9, Issue 6, May 16, 2010, pp. 473-477.
Qiao, J. W. et al., Materials Science and Engineering: A, vol. 527, Issues 29-30, Aug. 20, 2010, pp. 7752-7756.

(56) References Cited

OTHER PUBLICATIONS

Singer, I. L. et al., Wear, vol. 195, Issues 1-2, Jul. 1996, pp. 7-20.
Szuecs, F. et al., Acta Materialia, vol. 49, Issue 9, Feb. 2001, pp. 1507-1513.
Tan, H. et al., Intermetallics, vol. 10, Issues 11-12, Nov. 2002, pp. 1203-1205.
Wu, Hong et al., Transactions of Nonferrous Metals Society of China, vol. 22, Issue 3, Jan. 2012, pp. 585-589.
Zenebe et al., Tribology Letters, vol. 47, Issue 1, Apr. 28, 2012, pp. 131-138.
Zhu, Z. et al., Scripta Materialia, vol. 62, Issue 5, Nov. 18, 2009, pp. 278-281.
International Preliminary Report on Patentability for International Application PCT/US2013/047950, Report completed Dec. 31, 2014, Mailed Jan. 8, 2015, 7 Pgs.
International Preliminary Report on Patentability for International Application PCT/US2013/050614, report Issued Jan. 20, 2015, Mailed Jan. 29, 2015, 9 Pgs.
International Search Report and Written Opinion for International Application PCT/US2014/033510, report completed Jan. 8, 2015, 2014, Mailed Jan. 8, 2015, 11 Pgs.
International Search Report and Written Opinion for International Application PCT/US2014/056615, report completed Dec. 29, 2014, Mailed Dec. 30, 2014, 13 Pgs.
Kim et al., "Weldability of Cu54Zr22Ti18Ni6 bulk metallic glass by ultrasonic welding processing", Materials Letters, 2014, 130, pp. 160-163.
Boopathy et al., "Near-threshold fatigue crack growth in bulk metallic glass composites", J. Mater. Res., vol. 24, No. 12, Dec. 2012, pp. 3611-3619.
Chen et al., "Formation of Micro-Scale Precision Flexures Via Molding of Metallic Glass", Oct. 2006, 4 pgs.
Greer et al., "Wear resistance of amorphous alloys and related materials", International Materials Reviews, 200, vol. 47, No. 2, Apr. 1, 2002, pp. 87-112.
Jiang et al., "Low-Density High-Strength Bulk Metallic Glasses and Their Composites: A Review", Advanced Engineering Materials, DOI: 10.1002/adem.201400252, Nov. 19, 2014, pp. 1-20.
Kobayashi et al. "Property of Ni-Based Metallic Glass Coating Produced by Gas Tunnel Type Plasma Spraying", International Plasma Chemistry Society, ISPC 20, 234, Philadelphia, USA, Jul. 24, 2011, Retrieved from: http://www.ispc-conference.org/ispcproc/ispc20/234.pdf.
Launey et al., "Solution to the problem of the poor cyclic fatigue resistance of bulk metallic glasses", PNAS Early Edition, Jan. 22, 2009, pp. 1-6.
Lillo et al. "Microstructure, Processing, Performance Relationships for High Temperature Coatings", U.S. Department of Energy, Office of Fossil Energy, under DOE Idaho Operations Office, Contract DE-AC07-05ID14517; 22nd Annual Conference on Fossil Energy Materials, Pittsburgh, U.S., Jul. 1, 2008, 8 pgs.
International Preliminary Report on Patentability for International Application PCT/US2014/056615, Report issued Mar. 22, 2016, Mailed Mar. 31, 2016, 11 Pgs.
"Corrosion of Titanium and Titanium Alloys", Total Materia, http://www.totalmateria.com/Article24.htm, Published Sep. 2001, Accessed Feb. 16, 2016.
Inoue, A. et al., "Recent development and application products of bulk glassy alloys", Acta Materialia, vol. 59, Issue 6, Jan. 20, 2011, 2243-2267.
Nishiyama, N. et al., "Recent progress of bulk metallic glasses for strainsensing devices", Materials Science and Engineering: A, vols. 449-451, Mar. 25, 2007, 79-83.
"Gear", Dictionary.com. Accessed Aug. 30, 2016.
"Group 4 element", Wkipedia, https://en.wikipedia.org/wiki/Group_4_element, Published Jun. 11, 2010, Accessed Aug. 24, 2016.
Nishiyama et al., "Development and applications of late transition metal bulk metallic glasses", Bulk Metallic Glasses. pp. 1-25, 2008.
Zhang et al., "Developments and applications of bulk metallic glasses", Rev. Adv. Mater. Sci. 18 (2008) 1-9.
International Preliminary Report on Patentability for International Application PCT/US2014/033510, Report issued Oct. 12, 2016, Mailed Oct. 20, 2016, 9 Pgs.

\* cited by examiner

SYSTEMS AND METHODS FOR FABRICATING STRUCTURES INCLUDING METALLIC GLASS-BASED MATERIALS USING ULTRASONIC WELDING

CROSS-REFERENCE TO RELATED APPLICATIONS

The current application claims priority to U.S. Provisional Application No. 61/814,998, filed Apr. 23, 2013, the disclosure of which is incorporated herein by reference.

STATEMENT OF FEDERAL FUNDING

The invention described herein was made in the performance of work under a NASA contract, and is subject to the provisions of Public Law 96-517 (35 U.S.C. 202) in which the Contractor has elected to retain title.

FIELD OF THE INVENTION

The present invention generally relates to fabricating structures including metallic glass-based materials using ultrasonic welding.

BACKGROUND

Metallic glasses, also known as amorphous alloys, embody a relatively new class of materials that is receiving much interest from the engineering and design communities. Metallic glasses are characterized by their disordered atomic-scale structure in spite of their metallic constituent elements—i.e. whereas conventional metallic materials typically possess a highly ordered atomic structure, metallic glass materials are characterized by their disordered atomic structure. Notably, metallic glasses typically possess a number of useful material properties that can allow them to be implemented as highly effective engineering materials. For example, metallic glasses are generally much harder than conventional metals, and are generally tougher than ceramic materials. They are also relatively corrosion resistant, and, unlike conventional glass, they can have good electrical conductivity. Importantly, the manufacture of metallic glass materials lends itself to relatively easy processing in certain respects. For example, the manufacture of a metallic glass can be compatible with an injection molding process.

Nonetheless, the manufacture of metallic glasses presents challenges that limit their viability as engineering materials. In particular, metallic glasses are typically formed by raising a metallic alloy above its melting temperature, and rapidly cooling the melt to solidify it in a way such that its crystallization is avoided, thereby forming the metallic glass. The first metallic glasses required extraordinary cooling rates, e.g. on the order of $10^6$ K/s, and were thereby limited in the thickness with which they could be formed. Indeed, because of this limitation in thickness, metallic glasses were initially limited to applications that involved coatings. Since then, however, particular alloy compositions that are more resistant to crystallization have been developed, which can thereby form metallic glasses at much lower cooling rates, and can therefore be made to be much thicker (e.g. greater than 1 mm). These metallic glass compositions that can be made to be thicker are known as 'bulk metallic glasses' ("BMGs").

In addition to the development of BMGs, 'bulk metallic glass matrix composites' (BMGMCs) have also been developed. BMGMCs are characterized in that they possess the amorphous structure of BMGs, but they also include crystalline phases of material within the matrix of amorphous structure. For example, the crystalline phases can exist in the form of dendrites. The crystalline phase inclusions can impart a host of favorable materials properties on the bulk material. For example, the crystalline phases can allow the material to have enhanced ductility, compared to where the material is entirely constituted of the amorphous structure. BMGs and BMGMCs can be referred to collectively as BMG-based materials. Similarly, metallic glasses, metallic glasses that include crystalline phase inclusions, BMGs, and BMGMCs can be referred to collectively as metallic glass-based materials or MG-based materials.

SUMMARY OF THE INVENTION

Systems and methods in accordance with embodiments of the invention fabricate objects including metallic glass-based materials using ultrasonic welding. In one embodiment, a method of fabricating an object that includes a metallic glass-based material includes: ultrasonically welding at least one ribbon to a surface; where at least one ribbon that is ultrasonically welded to a surface has a thickness of less than approximately 150 μm; and where at least one ribbon that is ultrasonically welded to a surface includes a metallic glass-based material.

In another embodiment, at least one ribbon that is ultrasonically welded to a surface has a thickness of less than approximately 100 μm.

In yet another embodiment, the metallic glass-based material was formed by exposing its composition to a cooling rate of greater than approximately $10^6$ K/s.

In still another embodiment, the metallic glass-based material was formed by exposing its composition to a cooling rate of greater than approximately $10^8$ K/s.

In still yet another embodiment, at least one ribbon that is ultrasonically welded to a surface includes a metallic glass-based material having a composition that is characterized by a critical casting thickness of greater than approximately 1 mm.

In a further embodiment, at least one ribbon that is ultrasonically welded to a surface includes a metallic glass-based material having a composition that is characterized by a temperature difference between its respective glass transition temperature and its crystallization temperature of greater than approximately 90° C.

In a still further embodiment, the metallic glass-based material is such that when the associated ribbon is ultrasonically welded to a surface, the adjoined surfaces exhibit less than 10% porosity.

In a yet further embodiment, at least one ribbon that is ultrasonically welded to a surface includes a metallic glass-based material, for which the most abundant constituent element is one of: Zr, Ti, Cu, Ce, Ni, Fe, La, Mg, Pd, Pt, Au, and Ag.

In a still yet further embodiment, at least one ribbon that is ultrasonically welded to a surface includes a metallic glass-based material that is one of: $Zr_{51}Ti_9Cu_{15}Be_{25}$; $Zr_{54}Ti_{11}Cu_{12.5}Be_{22.5}$; $Zr_{35}Ti_{30}Cu_{8.25}Be_{26.75}$; $Zr_{41.2}Ti_{13.8}Ni_{10}Cu_{12.5}Be_{22.5}$; $Zr_{46.75}Ti_{8.25}Ni_{10}Cu_{7.5}Be_{27.5}$; $Pd_{43}Ni_{10}Cu_{27}P_{20}$; $Pt_{60}Ni_{15}P_{25}$; $Ce_{68}Cu_{20}Al_{10}Nb_2$; $Au_{49}Ag_{5.5}Pd_{2.3}Cu_{26.9}Si_{16.3}$; $Pt_{57.5}Cu_{14.7}Ni_{5.3}P_{22.5}$; $Zr_{36.6}Ti_{31.4}Nb_7Cu_{5.9}Be_{19.1}$; $Ti_{48}Zr_{20}V_{12}Cu_5Be_{15}$; and mixtures thereof.

In another embodiment, each of a plurality of ribbons is ultrasonically welded to a surface.

In still another embodiment, at least one surface includes a metallic glass-based material.

In yet another embodiment, at least one surface includes a conventional crystalline metal.

In still yet another embodiment, a method of fabricating an object including a metallic glass-based material further includes removing portions of at least one ribbon that has been ultrasonically welded to a surface.

In a further embodiment, removing portions of at least one ribbon is accomplished using a milling tool.

In a still further embodiment, at least one surface is flat.

In a yet further embodiment, at least one surface includes curves.

In a still yet further embodiment, at least a plurality of ribbons are simultaneously ultrasonically welded together.

In another embodiment, a method of fabricating an object including a metallic glass-based material further includes deforming the ultrasonically welded ribbon.

In still another embodiment, the surface is the inner wall of a pipe, and the metallic glass-based material is characterized by a reduced coefficient of friction relative to the inner wall of the pipe.

In yet another embodiment, the metallic glass-based material includes a precious metal.

In still yet another embodiment, the precious metal is one of gold, silver, platinum, ruthenium, rhodium, palladium, osmium, iridium, and combinations thereof.

In a further embodiment, each of a plurality of ribbons is ultrasonically welded to a surface, such that the aggregate of each of the plurality of ribbons forms a piece of jewelry.

In a still further embodiment, the formed piece of jewelry includes greater than approximately 90% precious metal, as measured by mass.

In a yet further embodiment, the formed piece of jewelry includes greater than approximately 90% precious metal, as measured by atomic ratio.

In a still yet further embodiment, the formed piece of jewelry includes greater than approximately 95% precious metal, as measured by mass.

In another embodiment, the formed piece of jewelry includes greater than approximately 95% precious metal, as measured by atomic ratio.

BRIEF DESCRIPTION OF THE DRAWINGS

FIGS. 3A-3D illustrate iteratively ultrasonically welding each of a plurality of ribbons to a surface in accordance with an embodiment of the invention.

DETAILED DESCRIPTION

Figure 1:
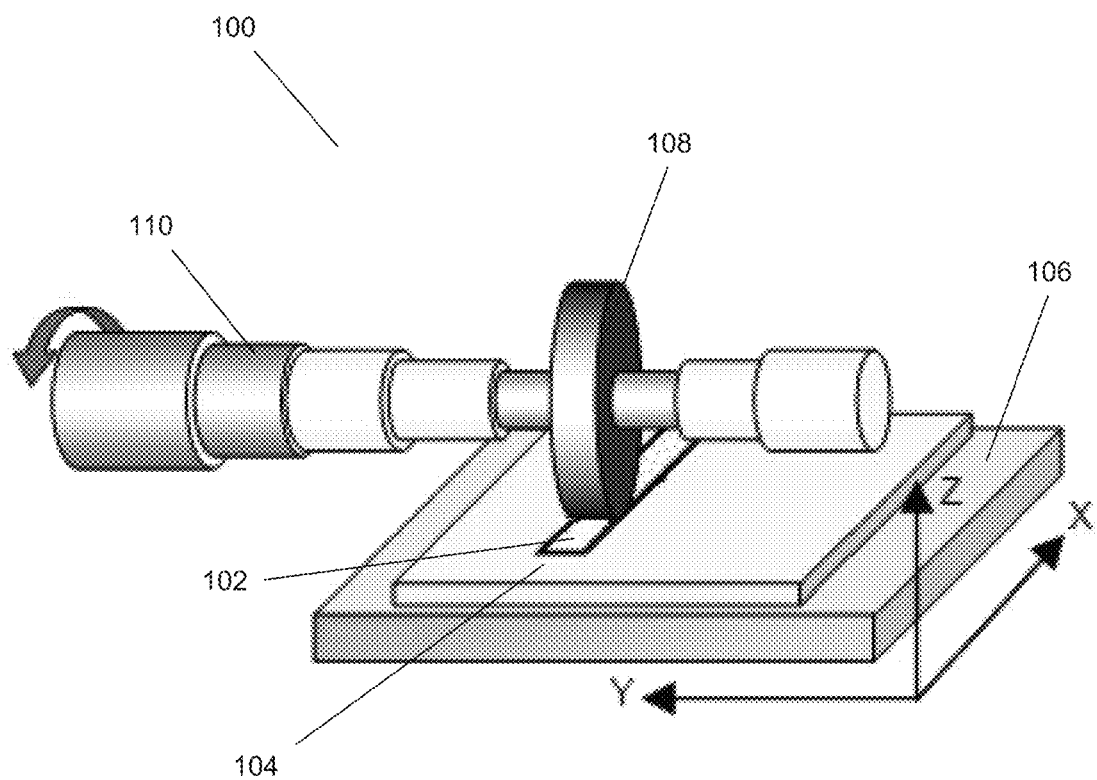
FIG. 1 illustrates ultrasonically welding a ribbon to a surface in accordance with an embodiment of the invention.

Turning now to the drawings, systems and methods for fabricating objects including a metallic glass-based material using ultrasonic welding are illustrated. In many embodiments, a method of fabricating an object that includes a metallic glass-based material includes ultrasonically welding at least one ribbon to a surface, where the ribbon includes a metallic glass-based material and has a thickness of less than approximately 150 µm. In numerous embodiments a series of ribbons that include a metallic glass-based material and are less than approximately 150 µm are each ultrasonically welded to at least one other ribbon that has been ultrasonically welded to a surface in an iterative manner to build up a desired object in accordance with an ultrasonic consolidation process. In a number of embodiments, at least one of the ribbons that is ultrasonically welded to a surface includes a metallic glass-based material that is characterized in that it has relatively good glass forming ability. In several embodiments, the included metallic glass-based material has a critical casting thickness of greater than approximately 1 mm. In some embodiments, the included metallic glass-based material is characterized in that the temperature difference between its crystallization temperature and its glass transition temperature is greater than approximately 90° C. In several embodiments, the most abundant constituent element within the included metallic glass-based is a precious metal. In a number of embodiments, the method of fabricating an object including a metallic glass-based material further includes raising the temperature of the metallic glass-based material to above its respective glass transition temperature, and deforming the heated metallic glass-based material.

While metallic glass-based materials are characterized by a host of desirable materials properties, it has proved to be challenging to fabricate objects that include metallic glass-based materials so as to take advantage of their beneficial materials properties. For example, although molten metallic glass compositions can be cast into molds to form them into desired shapes, these fabrication techniques are limited insofar as care must be taken to ensure that after the molten composition is cast, it can be subjected to a sufficiently high cooling rate (i.e. the critical cooling rate) so as to develop the desired amorphous structure that gives rise to the sought after material properties. This generally imposes an upper limit on the thickness of the cast part (with the general understanding that thicker parts are slower to cool).

Against this background, it would be useful to develop techniques that can allow the fabrication of objects that include metallic glass-based materials in any of a variety of form factors. Thus, for instance, Douglas Hofmann disclosed techniques for forming solid layers of a metallic glass-based material by applying a liquid phase coating layer of a metallic glass-based composition to a surface and rapidly cooling the surface in U.S. patent application Ser. No. 14/060,478, entitled "Systems and Methods Implementing Layers of Metallic Glass-Based Materials". Douglas Hofmann et al. also disclose techniques for deforming provided metallic glass-based feedstock materials—e.g. in the form of a solid layer—into desired shapes in U.S. patent application Ser. No. 14/525,585, entitled "Systems and Methods for Shaping Sheet Materials that Include Metallic Glass-Based Materials". Douglas Hofmann also disclosed techniques for additively manufacturing a component that includes a metallic glass-based material using, for example, a thermal spraying technique in U.S. patent application Ser. No. 14/163,936, entitled "Systems and Methods for Fabricating Objects Including Amorphous Metal Using Techniques Akin to Additive Manufacturing." The disclosures of U.S. patent application Ser. Nos. 14/060,478, 14/163,936, and 14/525,585 are each hereby incorporated by reference in their entirety. The state of the art can benefit from further techniques for fabricating objects that include metallic glass-based materials.

Thus, in many embodiments of the invention, methods for fabricating an object that includes a metallic glass-based material include using ultrasonic welding to adjoin a ribbon that includes a metallic glass-based material to a surface. Ultrasonic welding is a low temperature bonding technique whereby high-frequency ultrasonic acoustic vibrations are locally applied to work pieces being held together under pressure to create a solid-state weld. For example, high frequency ultrasonic vibrations may be on the order of 20,000 Hz. Notably, using low temperature bonding techniques to adjoin a ribbon that includes a metallic glass-based material can be advantageous insofar as it can reduce the risk of corrupting the amorphous structure of the metallic glass-based material and, as a result, can allow the retention of its desirable material properties. In many instances, ribbons are iteratively ultrasonically welded so as to build up an object having a desired shape in accordance with ultrasonic consolidation techniques. Generally, 'ultrasonic consolidation' (also known as ultrasonic additive manufacturing) can be understood to refer to an additive manufacturing technique that is based on the ultrasonic welding of ribbons. Using ultrasonic welding to fabricate objects that include metallic glass-based materials in these ways can confer a host of advantages. Implementing ultrasonic welding techniques in conjunction with ribbons that include a metallic glass-based material is now described in greater detail below.

Ultrasonic Welding of Ribbons Including Metallic Glass-Based Materials

In many embodiments, a ribbon that includes a metallic glass-based material is ultrasonically welded to a surface to create an object including a metallic glass-based material. Any suitable metallic glass-based material can be implemented, and any suitable surface can be implemented. In many embodiments, this process is iterated to build up a part. In this way, the described techniques are versatile.

Notably, any ultrasonic welding technique may be incorporated in accordance with embodiments of the invention. For example, FIG. 1 depicts a typical ultrasonic welding apparatus that may be used to ultrasonically weld a ribbon that includes a metallic glass-based material with a surface in accordance with embodiments of the invention. In particular, FIG. 1 depicts a ribbon that includes a metallic glass-based material 102 that is being ultrasonically welded to a base surface 104. The ribbon 102 and the base surface 104 are supported by an anvil 106. The ultrasonic welding apparatus 100 includes a horn 108 that applies pressure to the ribbon 102 and the base surface 104 and causes the ultrasonic vibrations that result in the bonding of the ribbon 102 and the base surface 104. The transducer 110 actuates the horn 108 allowing it to ultrasonically vibrate the surfaces to be adjoined. While the illustrated embodiment depicts a ribbon that is in a rectangular shape being adjoined to a surface, the ribbon can be of any shape in accordance with embodiments of the invention. For example, a ribbon having a circular shape can be ultrasonically welded to a surface in accordance with embodiments of the invention.

Figure 2:
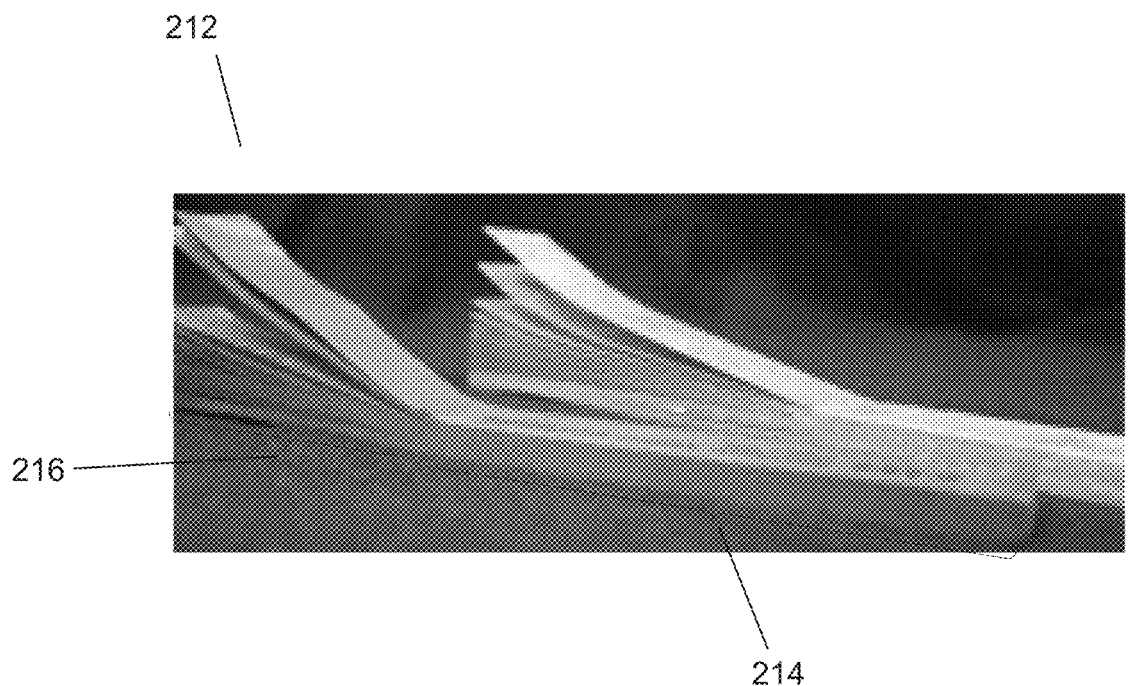
FIG. 2 illustrates simultaneously ultrasonically welding a plurality of ribbons to form an object in accordance with an embodiment of the invention.

In some embodiments, a plurality of ribbons—at least one of which including a metallic glass-based ribbon—are simultaneously ultrasonically welded together. For example, FIG. 2 depicts that a plurality of ribbons having been simultaneously ultrasonically welded. In particular, FIG. 2 depicts two stacks of ribbons 212, each having a portion that has been ultrasonically welded 214, and a portion that has not been ultrasonically welded 216. The contrast between the two portions 214 and 216 demonstrates the quality of the bond that can be formed. Again, while rectangular ribbons are illustrated, it should be clear that the ribbons can be of any shape in accordance with embodiments of the invention.

Figure 3B:
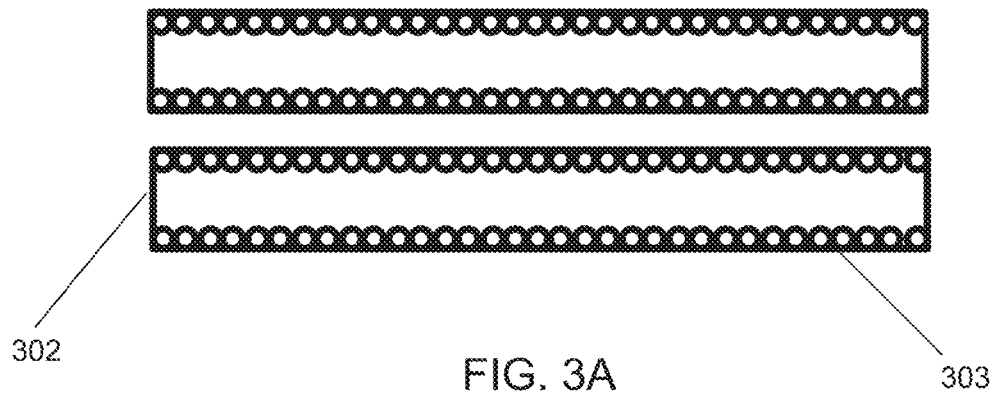
Figure 3B:
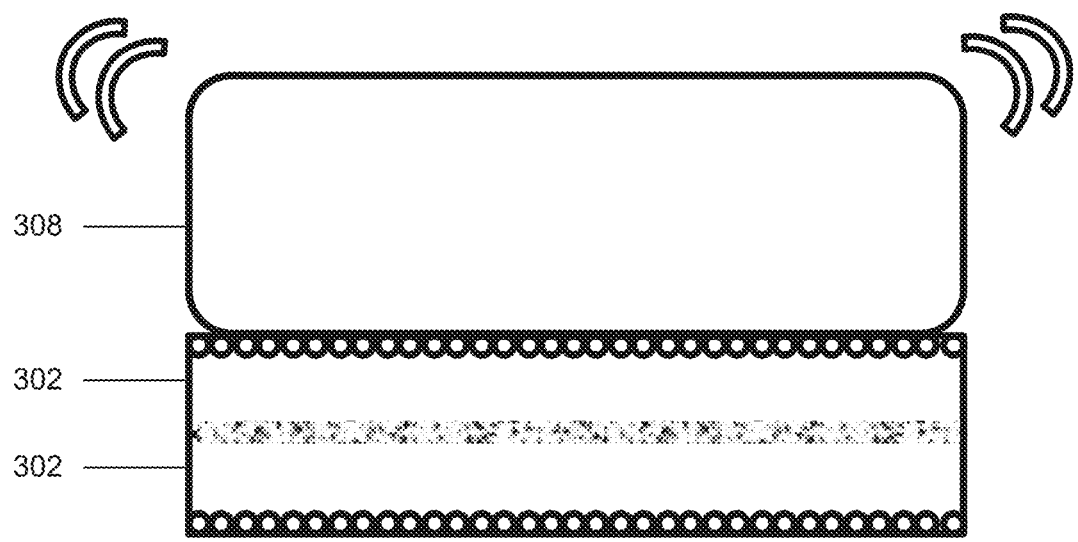

In a number of embodiments, each of a plurality of ribbons, at least one of which including a metallic glass-based material—is ultrasonically welded to a surface to form an object that includes a metallic glass-based material. For example, the ribbons may be iteratively ultrasonically welded, one on top of the other, in accordance with an ultrasonic consolidation process. FIGS. 3A-3D depict an object being fabricated by the iterative ultrasonic welding of ribbons that include metallic glass-based materials. In particular, FIG. 3A depicts two ribbons 302 that are to be ultrasonically welded together. Note that each of the ribbons is depicted as including a surface oxide layer 303. FIG. 3B depicts the bonding of the two ribbons 302 using an ultrasonic welding apparatus 308. Note that in FIG. 3B the surface oxide that was present at the interface is dissolved.

It is generally understood that when ultrasonically welding two ribbons, each of the ribbons may have a surface oxide and the ultrasonic welding operation functions to dissolve the surface oxide thereby allowing the ribbons to fuse. Additionally, in many instances, the ultrasonic welding does not result in a homogenous microstructure; instead there may be a distinct weld region that separates the base regions. Although, it should of course be understood that embodiments of the invention are not limited to the achievement of these phenomena.

Figure 3C:
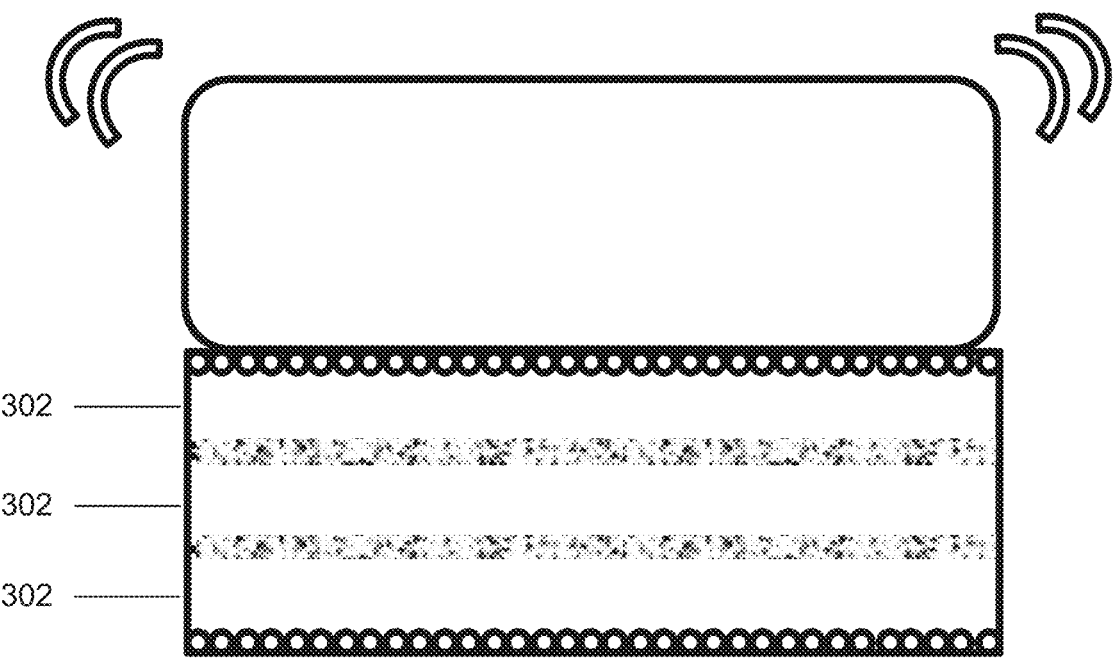
Figure 3D:
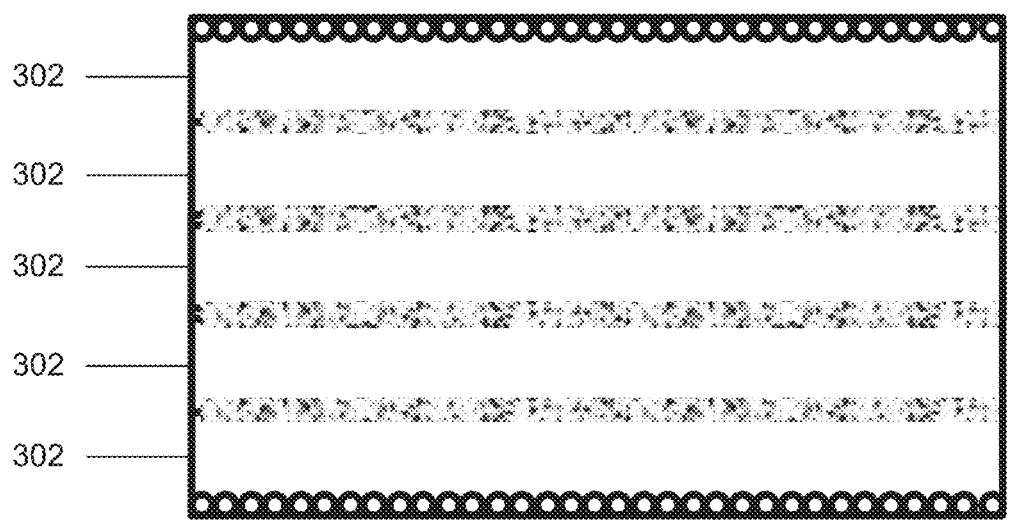

FIG. 3C depicts that a third ribbon has been ultrasonically welded to the previously welded ribbons. FIG. 3D depicts that this process has been iterated two more times. Of course it should be understood that this process can be iterated any number of times in accordance with embodiments of the invention. The aggregate of the ribbons 302 can thereby form a single contiguous object where each of the deposited ribbons 302 defines a different layer of the fabricated object. In this way, the final fabricated object can embody a laminated structure. Importantly, as can be appreciated, the ribbons that are ultrasonically welded to a surface can adopt any shape such that any of a variety of objects can be built up using this ultrasonic consolidation technique. For example, in many embodiments, the ribbons of varying cross-sections are ultrasonically welded together to form a desired object. In a number of embodiments, the shape of the ribbons includes holes; consequently, objects having hollowed out portions can be fabricated. In effect, the shape of the ultrasonically welded ribbon defines the shape of the cross-section of the built up object. In general, ribbons having any of a variety of shapes can be implemented, which can allow for the fabrication of objects having any of a variety of shapes.

Figure 4A:
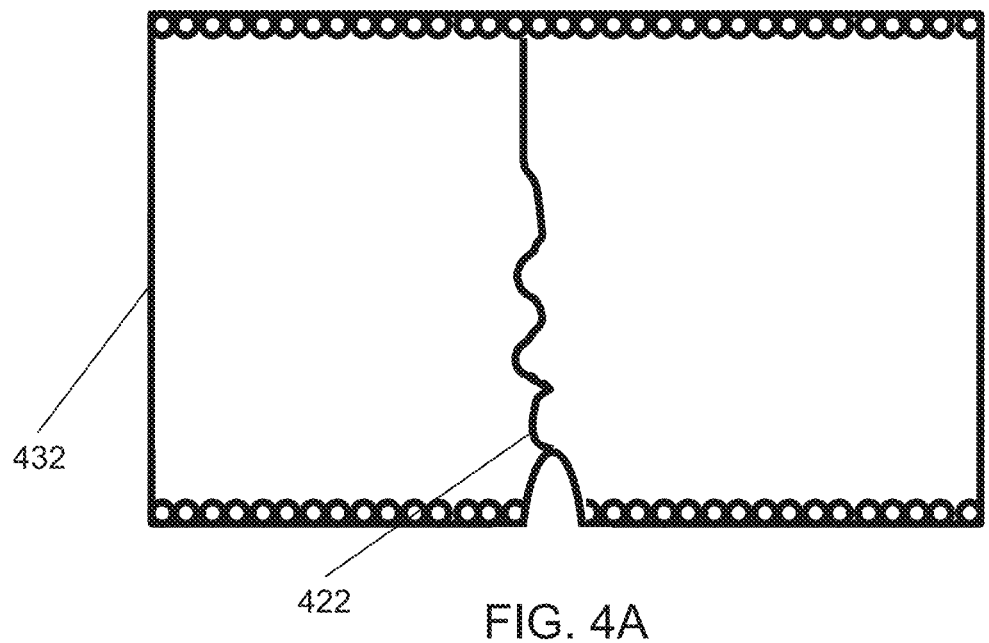
FIGS. 4A-4B illustrate how crack propagation may be redirected in structures fabricated by the iterative ultrasonic welding of ribbons in accordance with an embodiment of the invention.
Figure 4B:
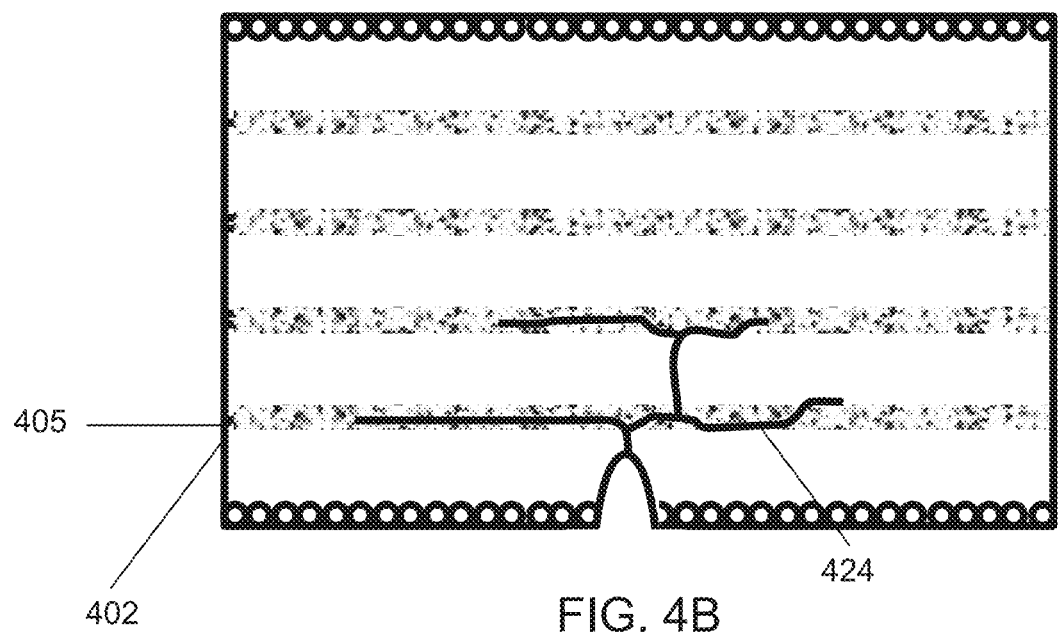

Notably, in many instances, the distinct weld regions can improve the material properties of the bulk fabricated structure. For instance, FIGS. 4A and 4B depict how the 'laminated structure' can divert the propagation of a crack. In particular, FIG. 4A depicts a situation where a crack 422 has propagated through a single homogenous structure 432 to an extent that it causes its complete fracture. Conversely, FIG. 4B depicts the analogous situation where the structure is constituted of ultrasonically welded ribbons 402, and includes welding regions 405. Importantly, FIG. 4B depicts that the welded regions 405 divert the propagation of the crack so that it does not result in the complete fracturing of the part.

Importantly, it should also be noted that the ribbons can include any of a variety of metallic glass-based material in accordance with embodiments of the invention. For example, whereas conventional techniques for fabricating objects that include metallic glass-based materials may be limited to implementing bulk metallic glass-based materials, the instant techniques are not necessarily so limited to implementing some specific subset of metallic glass-based materials. For instance, in many embodiments the ribbons that are ultrasonically welded have a thickness of less than approximately 150 µm, and have been correspondingly cooled at cooling rates higher than approximately $10^6$ K/s to form the constituent metallic glass-based material. In numerous embodiments, the ribbons that are ultrasonically welded have a thickness less than approximately 100 µm. As can be appreciated, thinner ribbons can promote faster cooling rates, and there exist many metallic glass-based compositions that can be formed with such rapid cooling rates. Indeed, many of these compositions may be better suited materials from which to form the object. For example, jewelry can be fabricated using ribbons that include a metallic glass-based material that includes constituent precious metals in accordance with embodiments of the invention—this will be described in greater detail below.

It should thus be clear that any of a variety of metallic glass-based materials can be implemented in accordance with embodiments of the invention. For example, in many embodiments, the molten metallic alloy has a composition based on one of: zirconium, titanium, nickel, cobalt, iron, palladium, platinum, gold, copper, tungsten, niobium, hafnium, aluminum, and mixtures thereof. The term 'based on' can be understood as follows: when a composition is 'based on' an element, that element is the most abundant within the given composition. In a number of embodiments, the molten metallic alloy composition includes at least 50% (atomic) of one of the following combinations: Zr—Ti—Be, Cu—Zr, Cu—Zr—Al, Ni—P, Fe—P, Pd—P, Cu—P, Al—Y, and Ni—Nb (note that the relative atomic ratios of the elements are not listed—they can be present in any relative amount in accordance with embodiments of the invention). In many embodiments, the metallic glass-based material is one of the materials reported by Gang Duan et al. in *Advanced Materials* 2007, 19, 4272-4275, "Bulk Metallic Glass with Benchmark Thermoplastic Processability," i.e. one of: $Zr_{51}Ti_9Cu_{15}Be_{25}$; $Zr_{54}Ti_{11}Cu_{12.5}Be_{22.5}$; $Zr_{35}Ti_{30}Cu_{8.25}Be_{26.75}$; $Zr_{41.2}Ti_{13.8}Ni_{10}Cu_{12.5}Be_{22.5}$; $Zr_{46.75}Ti_{8.25}Ni_{10}Cu_{7.5}Be_{27.5}$; $Pd_{43}Ni_{10}Cu_{27}P_{20}$; $Pt_{60}Ni_{15}P_{25}$; $Ce_{68}Cu_{20}Al_{10}Nb_2$; $Au_{49}Ag_{5.5}Pd_{2.3}Cu_{26.9}Si_{16.3}$; $Pt_{57.5}Cu_{14.7}Ni_{5.3}P_{22.5}$; and mixtures thereof. The disclosure of *Advanced Materials* 2007, 19, 4272-4275 is hereby incorporated by reference. In many embodiments, the metallic glass-based material is one of: $Zr_{36.6}Ti_{31.4}Nb_7Cu_{5.9}Be_{19.1}$; $Ti_{48}Zr_{20}V_{12}Cu_5Be_{15}$; $Fe_{65}B_{20}i_{15}$; $Fe_{38}Ni_{37}B_{22}Mo_3$; $Co_{59.5}B_{22}Si_8Fe_4Ni_4Mo_{2.5}$; $Co_{52}B_{21}Si_{15}Fe_8Ni_4$; $Fe_{67}B_{21}Si_8Cr_4$; and mixtures thereof. In many embodiments, the metallic glass-based material is based on Aluminum—a metallic glass-based material that is based on Aluminum can be relatively less dense and can thereby be advantageous for certain applications.

In numerous embodiments, metallic glass-based materials are implemented that promote the efficacy of the bonding caused by the ultrasonic welding. For example, ultrasonic welding may leave voids in between the adjoined surfaces, and the extent of this porosity may be a function of the constituent materials being ultrasonically welded. Accordingly, the implemented metallic glass-based material may be selected so as to reduce the porosity. Thus, in many embodiments, a metallic glass-based material is implemented such that the extent of any such porosity between ultrasonically welded ribbons is less than approximately 10% of the bonded surface area. In many embodiments a metallic glass-based material is implemented that allows the ultrasonic welding process to result in less than approximately 1% porosity.

Although several examples are given, it should be clear that any suitable metallic alloy composition that can be made to form a metallic glass-based material can be used in accordance with embodiments of the invention. It should again be emphasized that the metallic glass-based compositions that are used do not have to be bulk metallic glass compositions because the techniques described herein can include cooling thinly deposited layers of molten metallic alloys—thinly formed geometries cool much more rapidly than thick ones, and can thereby allow metallic glass-based material to form much more easily. In other words, the implemented metallic glass-based materials do not have to have relatively high critical cooling rates. As a result, whereas conventional techniques (e.g. casting) for forming relatively larger objects were largely limited to implementing bulk metallic glass compositions, the techniques described herein are generally not so limited.

Importantly, the toughness of an amorphous metal is also a function of the cooling rate by which it was formed. Demetriou et al. demonstrate this phenomenon in *Applied Physics Letters* 95, 041907 (2009), "Glassy steel optimized for glass-forming ability and toughness." The disclosure of *Applied Physics Letters* 95, 041907 (2009) is hereby incorporated by reference. In general, Demetriou et al. demonstrate that the toughness of a cast part will tend to linearly decrease as a function of its thickness.

Harmon et al. explain the underlying mechanisms for this phenomenon in *Physical Review Letters* 99, 135502 (2007), "Anelastic to Plastic Transition in Metallic Glass-Forming Liquids"; generally, Harmon et al. explain that the toughness of an amorphous metal is related to its internal energy, and increasing the cooling rate used in the formation of the amorphous metal can increase its internal energy. In other words, a high cooling rate can trap the largest free-volume in the glass, which can allow for a higher toughness. Thus, as thicker castings have lower cooling rates, parts that are cast thicker will tend to have a correspondingly lower toughness. And it follows that increasing the cooling rate in forming an amorphous metal can increase its toughness.

Bear in mind that the toughness of a material can correspond with any of a variety of its material properties. For example, that the toughness is correlated with its shear modulus is touched on in Garret et al., in *Applied Physics Letters* 101, 241913 (2012), "Effect of Microalloying on the toughness of metallic glasses." The disclosure of *Applied Physics Letters* 101, 241913 (2012) is hereby incorporated by reference. Generally, lower shear moduli correspond with higher toughness values.

Figure 5:
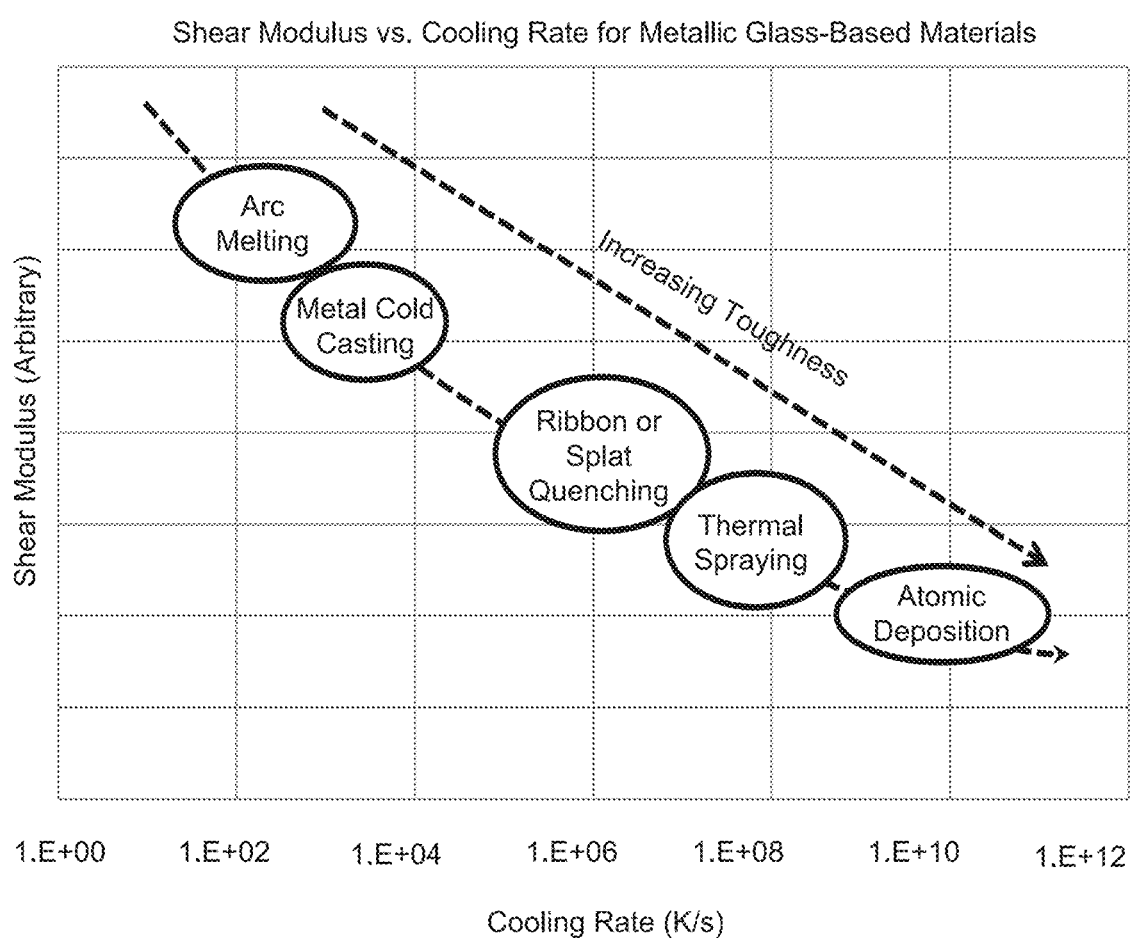
FIG. 5 illustrates the general relationship between cooling rate and mechanical properties for metallic glass-based materials.

FIG. 5 depicts how implementing rapid cooling rates can impact material properties. Generally, it is depicted that metallic glass-based materials can be made to be tougher when they are formed with faster cooling rates.

Thus, it can be seen that by using an ultrasonic consolidation process in accordance with embodiments of the invention, objects can be fabricated having relatively robust mechanical properties. For example, ribbons can be implemented that include metallic-glass based materials that were developed by implementing extremely rapid cooling rates, which can toughen the metallic glass-based material. Additionally, as described above, the 'laminated structure' can impede crack propagation and can thereby allow the fabricated object to demonstrate robust mechanical performance.

Figure 6:
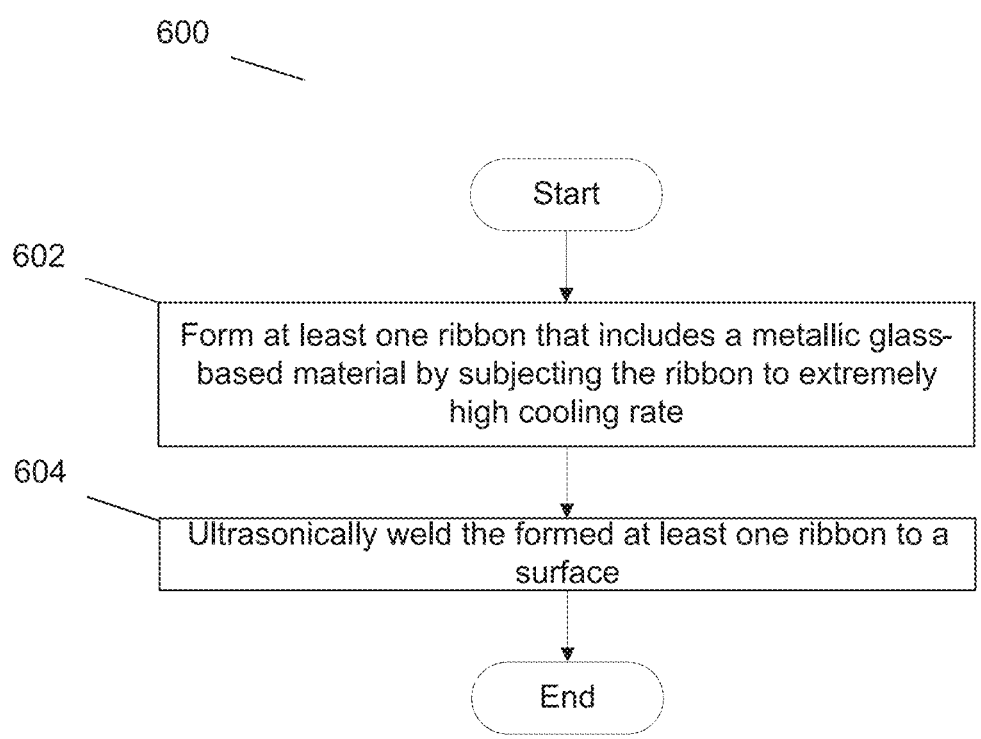
FIG. 6 illustrates a method of fabricating an object by forming at least one ribbon that includes a metallic glass-based material that has been cooled at a cooling rate above approximately $10^6$ K/s, and ultrasonically welding the formed ribbon to a surface in accordance with an embodiment of the invention.

Accordingly, in many embodiments of the invention, a method of fabricating an object that includes a metallic glass-based material includes forming at least one ribbon that includes a metallic glass-based material having robust mechanical properties, and ultrasonically welding the at least one formed ribbon to a surface to thereby fabricate the desired object. FIG. 6 depicts a method of fabricating an object including a metallic glass-based material where a ribbon is formed by subjecting it to an extremely high cooling rate, and thereby developing a metallic glass-based material having robust mechanical properties. In particular, the method 600 includes forming at least one ribbon that includes a metallic glass-based material by subjecting the ribbon to extremely high cooling rates. For example, a cooling rate of greater than approximately $10^6$ K/s can be implemented. In some embodiments, cooling rates as high as $10^8$ K/s are implemented. The high cooling rate can be achieved using any suitable forming process in accordance with embodiments of the invention. For example, the ribbon can be formed using ribbon or splat quenching, thermal spraying, atomic deposition, and/or combinations thereof. These techniques can allow high cooling rates to be manifested which can allow the metallic glass-based material within the formed ribbon to develop robust mechanical properties. Of course, it should be clear that the implemented metallic glass-based material can be developed to have robust mechanical properties in any suitable way in accordance with embodiments, not just by subjecting to a high cooling rate.

The method 600 further includes ultrasonically welding 604 the at least one of the formed ribbons to a surface to fabricate a desired object. As can be gleaned from the above discussion, the ribbons can be iteratively adjoined to surfaces, one on top of the order, in order to build up the desired part. Note that because ultrasonic welding is a low temperature bonding process, any risk of corrupting the inherent amorphous structure of the metallic glass-based material can be reduced.

Figure 7A:
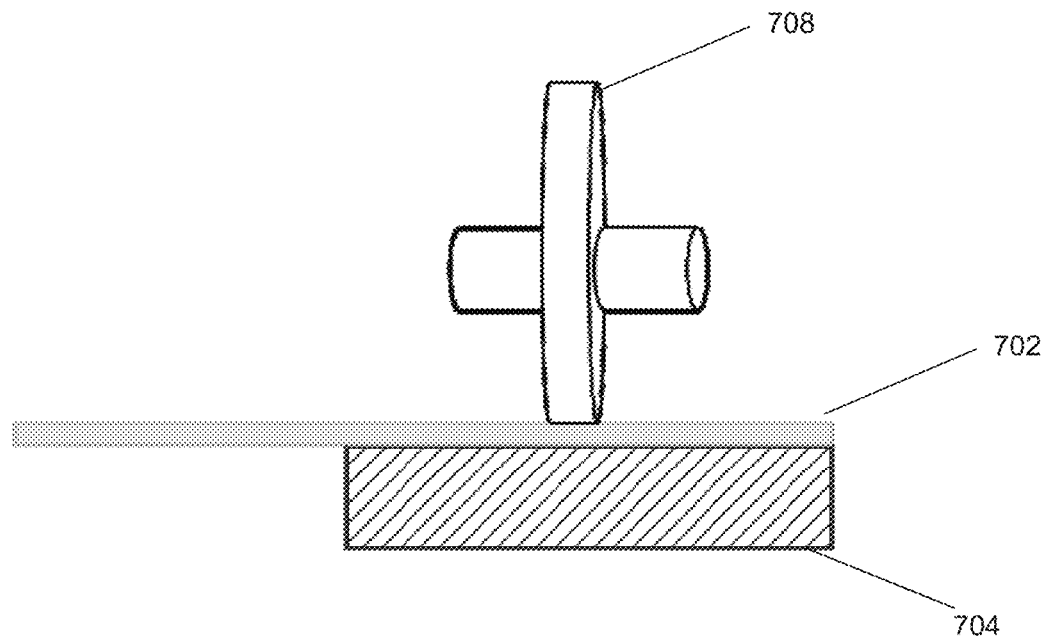
FIGS. 7A-7B illustrate fabricating objects by ultrasonically welding a ribbon that includes a metallic glass-based material to a surface that includes a conventional crystalline metal in accordance with an embodiment of the invention.
Figure 7B:
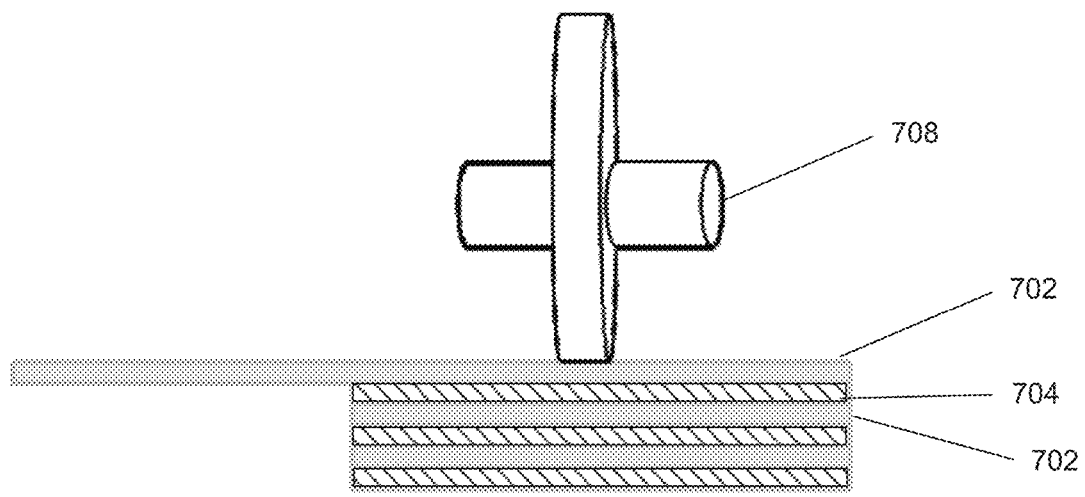

A ribbon including a metallic glass-based material can be ultrasonically welded to any suitable surface in accordance with embodiments of the invention. For example, in many embodiments, a ribbon including a metallic glass-based material is ultrasonically welded to a surface that includes a conventional metal having a crystalline structure. FIGS. 7A-7B depict ultrasonically welding a ribbon including a metallic glass-based material to a surface that includes a conventional crystalline metal in accordance with embodiments of the invention. In particular, FIG. 7A depicts that an ultrasonic welding apparatus 708 is being used to ultrasonically weld a ribbon that includes a metallic glass-based material 702 to a surface entirely constituted of a conventional crystalline metal 704. Ultrasonic welding can generally be used to adjoin two such distinct surfaces. FIG. 7B depicts that the ultrasonic welding apparatus 708 is used to ultrasonically weld the metallic glass-based ribbon 702 to a surface that includes alternating layers of ribbons including metallic glass-based material 702 and ribbons including only conventional crystalline metals 704. In general, ultrasonic welding can be used to adjoin any two metallic materials. In this way, highly customized objects that include metallic glass based materials can be fabricated—e.g. the objects can be fabricated to include different layers of materials. Note that although alternating layers of crystalline metallic materials and amorphous metallic materials are depicted, any of a variety of patterns of layers of materials can be implemented in accordance with embodiments of the invention. For instance, in some embodiments alternating ribbons, each including different metallic glass-based materials, are ultrasonically welded together.

Figure 8:
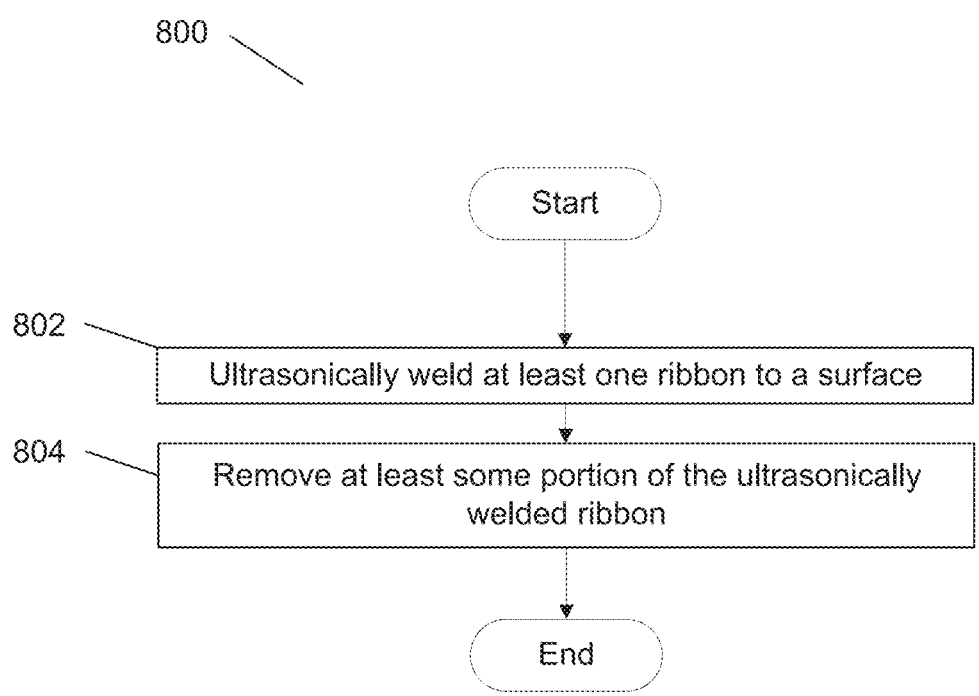
FIG. 8 illustrates a method of fabricating an object by ultrasonically welding at least one ribbon to a surface, and removing at least some portion of at least one ultrasonically welded ribbon in accordance with an embodiment of the invention.

It should also be clear that the above described processes can be varied in any number of ways in accordance with embodiments of the invention. For instance, in many embodiments, a method of fabricating an object including a metallic glass-based material includes iteratively ultrasonically welding ribbons including metallic glass-based material and removing portions of the ultrasonically welded ribbons. In this way, objects that include metallic glass-based materials and have arbitrary shapes can be fabricated. For example, FIG. 8 depicts a method for fabricating an object that includes a metallic glass-based material that includes iteratively ultrasonically welding ribbons to a surface and removing portions of the ultrasonically welded ribbons in accordance with embodiments of the invention. In particular, the illustrated method 800 includes ultrasonically welding 802 at least one ribbon including a metallic glass-based material to a surface. From the above, it should be clear that any metallic glass-based material can be implemented. Indeed, in many embodiments, the metallic glass-based material within the ribbon has been formed using a cooling rate of greater than approximately $10^6$ K/s. In a number of embodiments, the ribbon has a thickness of less than approximately 100 μm. As also can be appreciated from the discussion above, the metallic glass-based material can be welded to any suitable surface including a surface that includes a metallic glass-based material or a surface that includes only a conventional crystalline based metal. The method 800 further includes removing 804 at least some portion of at least one of the ultrasonically welded ribbons. The removal 804 of at least some portion of at least one of the ultrasonically welded ribbons can be achieved using any suitable technique. For instance, in some embodiments, a milling tool is used to remove the at least some portion. It should be clear however that any suitable technique may be implemented to remove some portion of the ribbon in accordance with embodiments of the invention. The ultrasonic welding 802 and the removal 804 can be repeated any number of times in accordance with embodiments of the invention. In this way any of a variety of shapes can be created. The removal of at least some portion of the ultrasonically welded ribbons can allow for the creation of shapes with a hollowed out portion.

Figure 9:
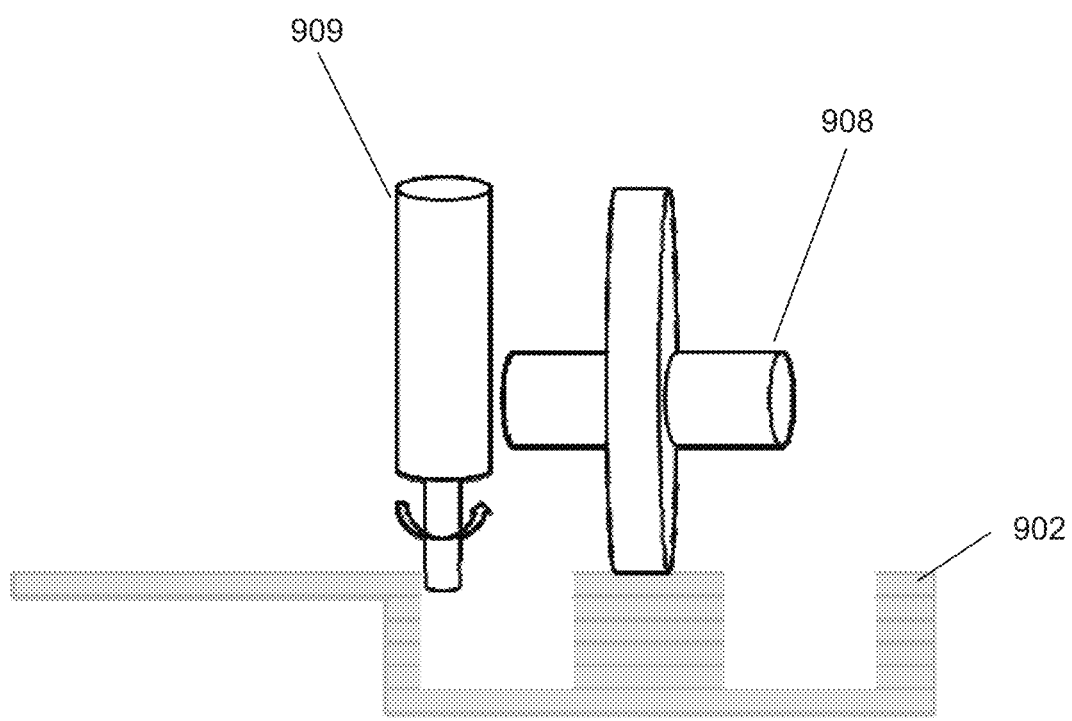
FIG. 9 schematically depicts ultrasonically welding each of a plurality of ribbons to a surface and using a milling tool to remove portions of some of the ultrasonically welded ribbons in accordance with an embodiment of the invention.

FIG. 9 depicts ultrasonically welding each of a plurality of ribbons to a surface and removing portions of at least some of the ultrasonically welded ribbons in accordance with embodiments of the invention. In particular, it is illustrated that an ultrasonic welding apparatus 908 is used to ultrasonically weld ribbons 902 together. In the illustrated embodiment, a milling tool 909 is depicted that is used to remove portions of the ultrasonically welded ribbons 902. In this way, any of a variety of arbitrary shapes that include metallic glass-based material can be implemented. It should be clear that although a milling tool is depicted, any of a variety of tools can be used to remove portions of ribbons including metallic glass based materials in accordance with embodiments of the invention.

Figure 10:
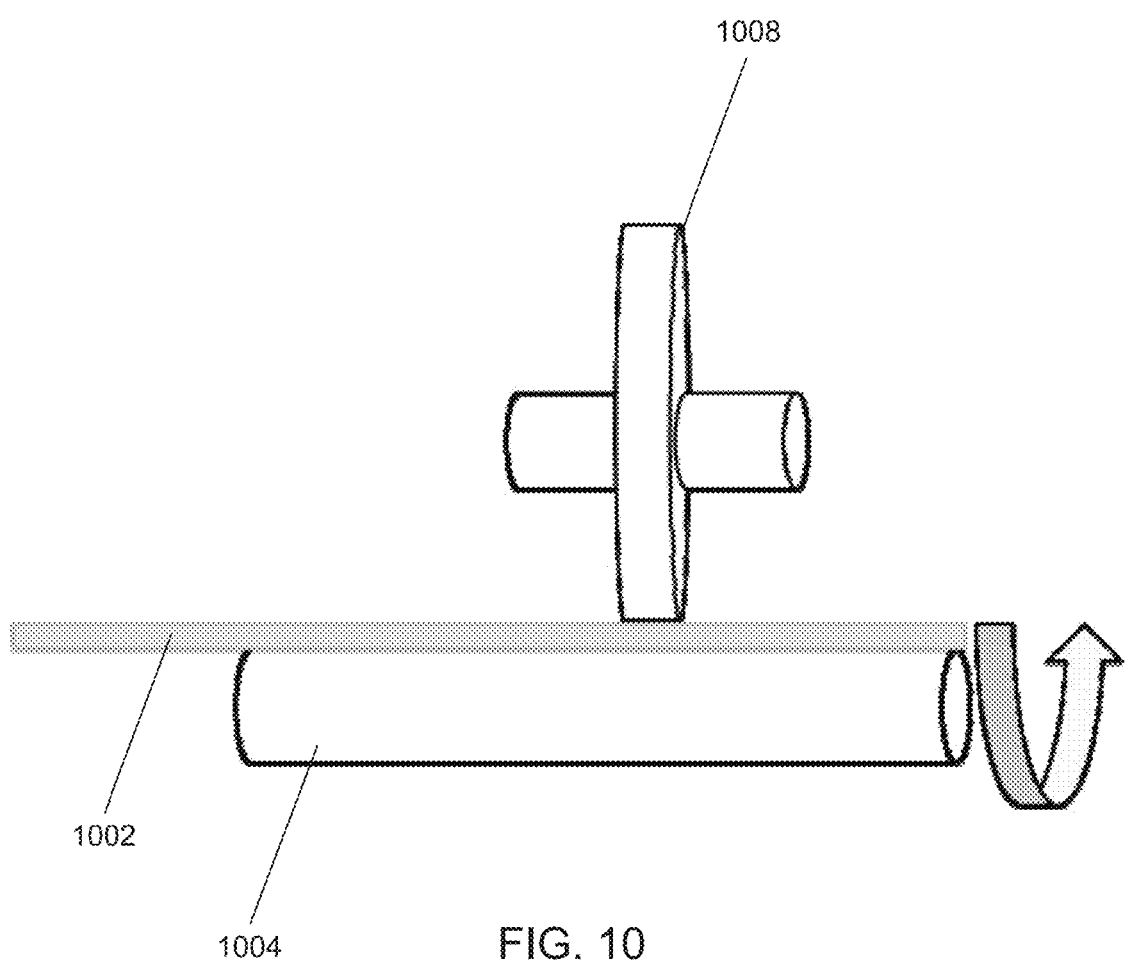
FIG. 10 illustrates ultrasonically welding a ribbon to a cylindrical surface in accordance with an embodiment of the invention.

Although the above illustrations have depicted ultrasonically welding a ribbon including a metallic glass-based material to a flat surface, it should be clear that a ribbon including a metallic glass-based material can be ultrasonically welded to any surface in accordance with embodiments of the invention. For instance, in many embodiments, a ribbon including a metallic glass based material is ultrasonically welded to a curved surface. FIG. 10 depicts the ultrasonic welding of a ribbon to a cylindrical surface in accordance with embodiments of the invention. In particular, FIG. 10 depicts that an ultrasonic welding apparatus 1008 is being used to ultrasonically weld a ribbon 1002 including a metallic glass-based material to a cylindrical surface 1004. Of course, it should be clear that although a cylindrical surface is depicted, a ribbon including a metallic glass-based material can be ultrasonically welded to any suitable surface of any suitable geometry in accordance with embodiments of the invention.

Figure 11A:
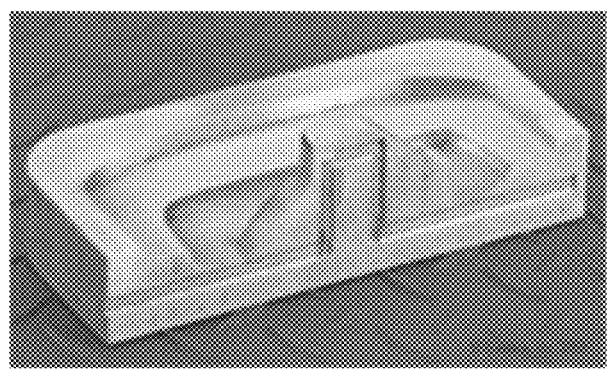
FIGS. 11A-11C illustrate objects that can be fabricated so as to include a metallic glass-based material in accordance with an embodiment of the invention.
Figure 11B:
Figure 11C:
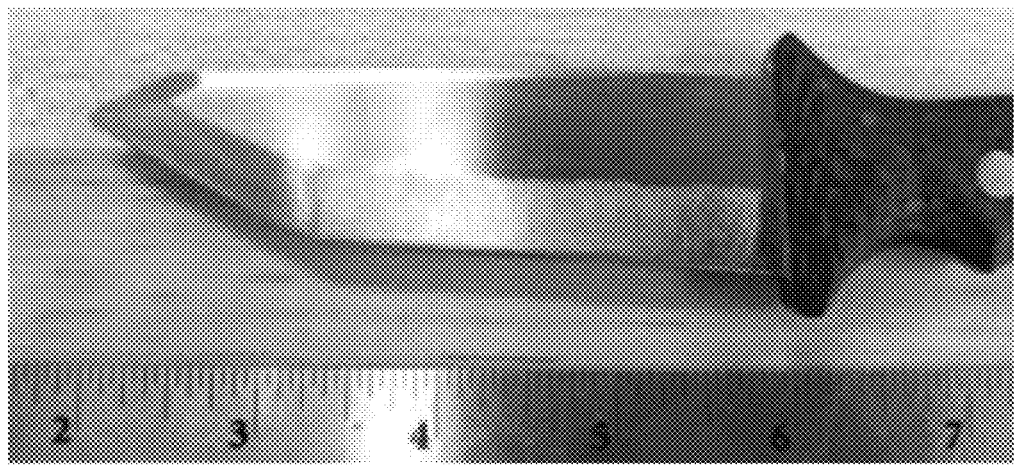

As can be inferred from the discussion above, the above-mentioned techniques are versatile and can be used to fabricate any of a variety of objects in accordance with embodiments of the invention. For instance, FIGS. 11A-11C depict a small sampling of objects that can be manufactured using the above-described techniques. In particular, FIG. 11A depicts a part having a distinct shape that can be fabricated to include a metallic glass-based material using the above-described techniques in accordance with embodiments of the invention. FIG. 11B depicts a watch head that can be fabricated in accordance with embodiments of the invention. And FIG. 11C depicts a knife that can be fabricated in accordance with embodiments of the invention.

Additionally, in many embodiments, ribbons of material are ultrasonically iteratively welded so as to form a sheet of material. As described in U.S. patent application Ser. No. 14/252,585 to Doug Hofmann et al., entitled "Systems and Methods for Shaping Sheet Materials that Include Metallic Glass-based Materials", there has been much industry interest in developing techniques for fabricating sheet materials that are constituted of metallic glass-based materials; it is believed that such sheet materials can more easily lend themselves to conventional manufacturing techniques, and can thereby facilitate the implementation of metallic glass-based materials. Thus, in many embodiments, such metallic glass-based sheet materials are formed using ultrasonic welding.

Figure 12:
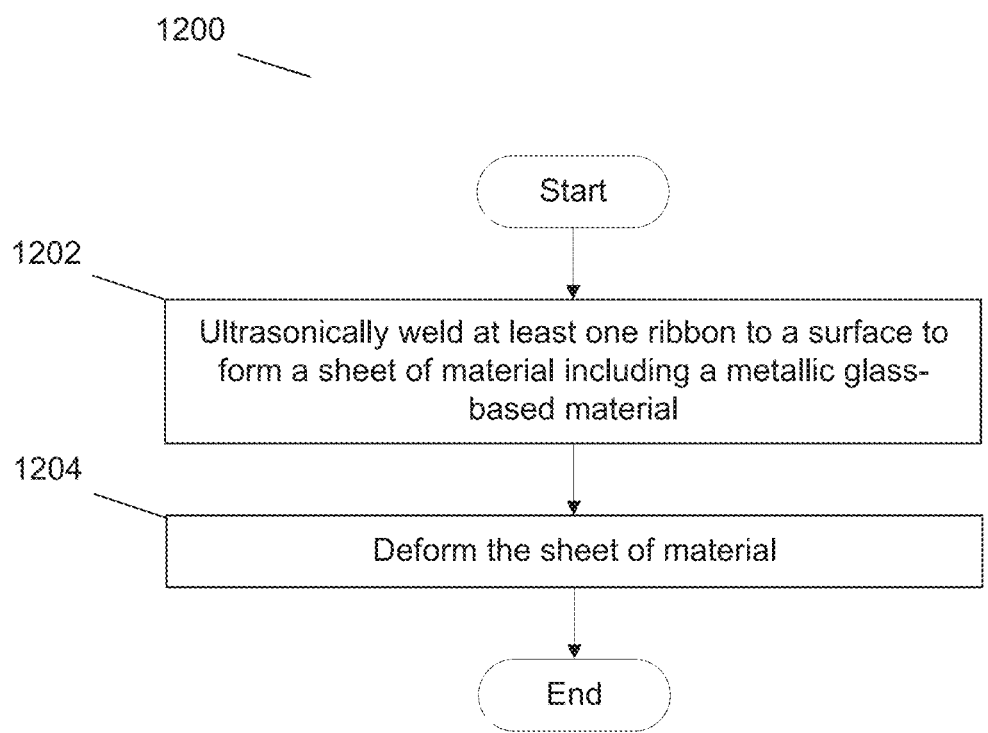
FIG. 12 illustrates fabricating an object that includes a metallic glass-based material by ultrasonically welding a ribbon to a surface to form a sheet material and deforming the sheet material in accordance with an embodiment of the invention.

In a number of embodiments, a method of fabricating an object that includes a metallic glass based material includes ultrasonically welding a ribbon that includes a metallic glass-based material to a surface so as to form a sheet of material, and thereafter deforming the sheet of material that includes a metallic glass based material using any suitable technique. FIG. 12 illustrates a method of fabricating an object including a metallic glass-based material by forming a sheet of material using ultrasonic welding, and thereafter deforming the formed sheet of material. In particular, the method 1200 includes ultrasonically welding 1202 at least one ribbon to a surface to form a sheet of material including a metallic glass-based material. As can be appreciated, any of the above described techniques can be implemented. In many embodiments, each of a plurality of ribbons—at least one of which including a metallic glass based material—is ultrasonically welded to at least one other ultrasonically welded ribbon to thereby form the sheet of material including a metallic glass-based material. As can be inferred from the above discussion, the metallic glass-based material can be any suitable material in accordance with embodiments of the invention. The method 1200 further includes deforming 1204 the sheet of material. Any suitable deformation technique can be implemented in accordance with embodiments of the invention. For instance, the sheet of material can be thermoplastically deformed. In these instances, it may be beneficial if the included metallic glass-based material can be characterized as a 'good glass former' in that it has can be either characterized by having a critical casting thickness of greater than approximately 1 mm or it can be characterized by having a large super-cooled liquid region, e.g. the temperature difference between its crystallization temperature and its glass transition temperature is greater than approximately 90° C. These characteristics can allow a metallic glass-based material to be thermoplastically formed more easily. In a number of embodiments, any of the techniques disclosed in U.S. patent application Ser. No. 14/252,585 to Doug Hofmann et al. can be implemented to shape the material. For example, U.S. patent application Ser. No. 14/252,585 describes localized thermoplastic forming, using a heated fluid to deform a material, frictionally heating the material to shape it, and cold-forming a sheet material. Any suitable technique can be used to deform the formed sheet material into a desired shape in accordance with embodiments of the invention. Although the above section has discussed the mechanical deformation sheet of material formed by the ultrasonic welding of constituent ribbons, it can be appreciated that any suitable structure can be deformed to form a desired structure in accordance with embodiments of the invention—not just sheet materials.

Thus, it is seen that the above-described techniques can be implemented in any of a variety of ways in accordance with embodiments of the invention. Moreover, they can be modified in any number of ways in accordance with embodiments of the invention. For example, in many embodiments a method of fabricating an object including a metallic glass-based material includes fabricating a ribbon including a metallic glass-based material, where the metallic glass-based material was formed with a cooling rate above approximately $10^6$ K/s, ultrasonically welding the ribbon to a surface to form a sheet of material, and deforming the sheet of material to form a desired shape. Of course, one of ordinary skill in the art would recognize that the above mentioned concepts can be varied in any number of ways; it is therefore to be understood that the present invention can be practiced otherwise than specifically described. Examples are now discussed below describing particular applications as to how the above-described techniques can be implemented.

EXAMPLES OF FABRICATING OBJECTS INCLUDING METALLIC GLASS-BASED MATERIALS USING ULTRASONIC WELDING

Figure 13:
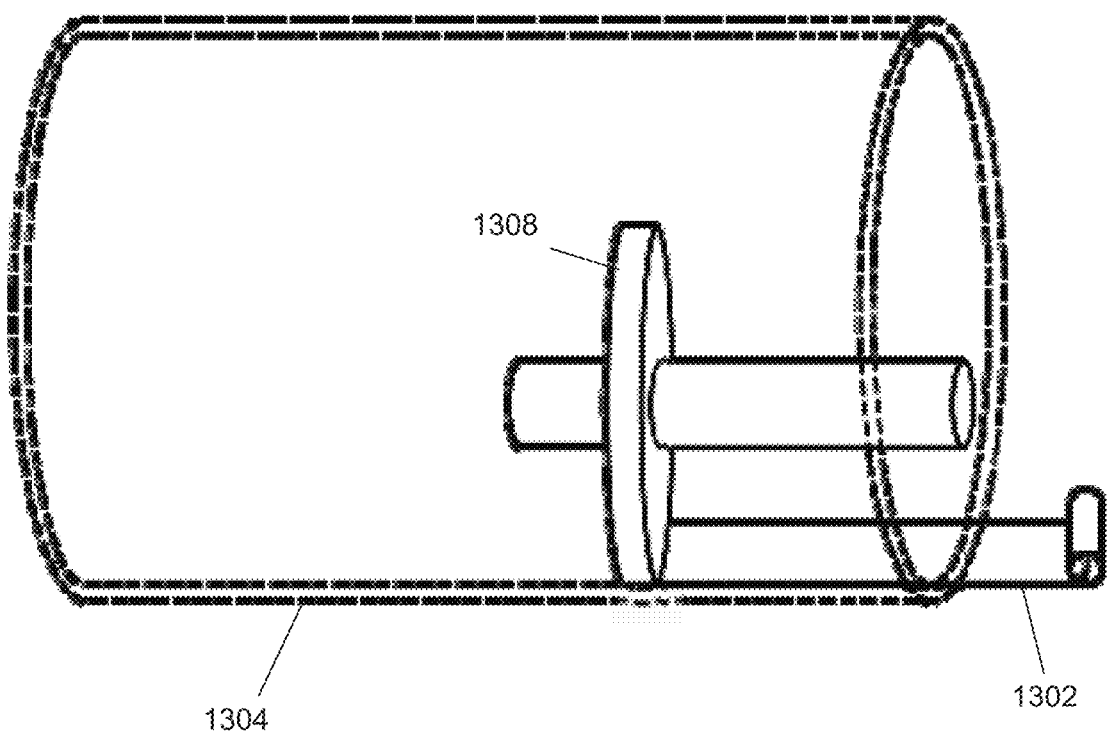
FIG. 13 illustrates lining the inside of a pipe with a metallic glass-based material in accordance with an embodiment of the invention.

The above-described techniques are versatile and can be implemented in any of a variety of scenarios in accordance with embodiments of the invention. For example, in some embodiments, the above described techniques are used to fabricate a pipe having a reduced friction inner lining. Generally, metallic glass-based materials can be made to possess a reduced coefficient of friction. Accordingly, lining the inside of a pipe with a metallic glass-based material can allow it to more easily transport fluid. Additionally, the energy required to transport fluid can also be reduced. FIG. 13 diagrams ultrasonically welding a ribbon that includes a metallic glass-based material having a reduced coefficient of friction to the interior of a pipe in accordance with embodiments of the invention. In particular, the illustration depicts that an ultrasonic welding apparatus 1308 is being used to ultrasonically weld a ribbon 1302 to a pipe 1304. As a result, any fluid flow that passes through the pipe can be transported more easily, as the metallic glass lining can provide a reduced friction surface. It should be clear that although the ribbon is depicted as lining the inside of the pipe, the ribbon can be ultrasonically welded to any portion of the pipe in accordance with embodiments of the invention.

In many embodiments, the above-described techniques are used to fabricate objects that include metallic-glass based materials that are based on precious metals. For example, in many embodiments, jewelry can be fabricated using the above described techniques. As described above, the ribbon materials that are implemented in the above-described techniques can include metallic glass-based materials that include precious metals (which may require high cooling rates to form). Accordingly, metallic glass-based materials where the most abundant constituent element is a precious metal—e.g. one of gold, silver, platinum, ruthenium, rhodium, palladium, osmium, iridium, and combinations thereof—can be implemented. For instance, in many embodiments, a ribbon including a metallic glass-based material that is based on a precious metal is ultrasonically welded to a surface. By iteratively ultrasonically welding such ribbons, an object that substantially includes precious metal material can be fabricated. In many instances, these techniques are used to fabricate a piece of jewelry that includes more than 60% precious metal. In a number of embodiments, the fabricated piece of jewelry includes more than 90% of precious metal. In numerous embodiments, the fabricated piece of jewelry includes 95% precious metal. Such objects may be particularly valuable insofar as the jewelry industry is keenly interested in obtaining jewelry that is of high purity (e.g. greater than 90% precious metal). Although it should of course be recognized that fabricated objects can include precious metals to any extent using techniques in accordance with embodiments of the invention.

As can be inferred from the above discussion, the above-mentioned concepts can be implemented in a variety of arrangements in accordance with embodiments of the invention. Accordingly, although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive.

What claimed is:

1. A method of fabricating an object that includes a metallic glass-based material comprising:
   ultrasonically welding a first ribbon to a surface;
   ultrasonically welding at least a second ribbon to a surface;
   wherein at least the first ribbon or the second ribbon has a thickness of less than approximately 150 µm; and
   wherein at least the first ribbon or the second ribbon comprises a metallic glass-based material;
   wherein each of the first ribbon and the at least second ribbon conforms to a geometry that is entirely defined by a flat face extruded through a thickness;
   wherein the ultrasonic welding of at least one ribbon to a surface results in the bonding of the majority of the surface area of the respective flat face to the surface; and
   wherein the ribbons ultrasonically welded to respective surfaces collectively define a desired shape in the object to be fabricated.

2. The method of claim 1, wherein at least one ribbon that is ultrasonically welded to a surface has a thickness of less than approximately 100 µm.

3. The method of claim 2, wherein the metallic glass-based material was formed by exposing its composition to a cooling rate of greater than approximately $10^6$ K/s.

4. The method of claim 1, wherein the metallic glass-based material was formed by exposing its composition to a cooling rate of greater than approximately $10^4$ K/s.

5. The method of claim 3, wherein at least one ribbon that is ultrasonically welded to a surface comprises a metallic glass-based material having a composition that is characterized by a critical casting thickness of greater than approximately 1 mm.

6. The method of claim 3, wherein at least one ribbon that is ultrasonically welded to a surface comprises a metallic glass-based material having a composition that is characterized by a temperature difference between its respective glass transition temperature and its crystallization temperature of greater than approximately 90° C.

7. The method of claim 3, wherein the metallic glass-based material is such that when the associated ribbon is ultrasonically welded to a surface, the adjoined surfaces exhibit less than 10% porosity.

8. The method of claim 3, wherein at least one ribbon that is ultrasonically welded to a surface comprises a metallic glass-based material, for which the most abundant constituent element is one of: Zr, Ti, Cu, Ce, Ni, Fe, La, Mg, Pd, Pt, Au, and Ag.

9. The method of claim 8, wherein at least one ribbon that is ultrasonically welded to a surface comprises a metallic glass-based material that is one of: $Zr_{51}Ti_9Cu_{15}Be_{25}$; $Zr_{54}Ti_{11}Cu_{12.5}Be_{22.5}$; $Zr_{35}Ti_{30}Cu_{8.25}Be_{26.75}$; $Zr_{41.2}Ti_{13.8}Ni_{10}Cu_{12.5}Be_{22.5}$; $Zr_{46.75}Ti_{8.25}Ni_{10}Cu_{7.5}Be_{27.5}$; $Pd_{43}Ni_{10}Cu_{27}P_{20}$; $Pt_{60}Ni_{15}P_{25}$; $Ce_{68}Cu_{20}Al_{10}Nb_2$; $Au_{49}Ag_{5.5}Pd_{2.3}Cu_{26.9}Si_{16.3}$; $Pt_{57.5}Cu_{14.7}Ni_{5.3}P_{22.5}$; $Zr_{36.6}Ti_{31.4}Nb_7Cu_{5.9}Be_{19.1}$; $Ti_{48}Zr_{20}V_{12}Cu_5Be_{15}$; and mixtures thereof.

10. The method of claim 3, wherein the ultrasonic welding of at least a second ribbon to a surface occurs subsequent to the ultrasonic welding of the first ribbon to a surface.

11. The method of claim 10, wherein at least one surface that either the first ribbon or the second ribbon is ultrasonically welded to comprises a metallic glass-based material.

12. The method of claim 10, wherein at least one surface that either the first ribbon or the second ribbon is ultrasonically welded to comprises a conventional crystalline metal.

13. The method of claim 10, further comprising removing portions of at least one ribbon that has been ultrasonically welded to a surface.

14. The method of claim 13, wherein removing portions of at least one ribbon is accomplished using a milling tool.

15. The method of claim 3, wherein at least one surface that a ribbon is ultrasonically welded to is flat.

16. The method of claim 3, wherein at least one surface that a ribbon is ultrasonically welded to includes curves.

17. The method of claim 3, wherein at least a plurality of ribbons are simultaneously ultrasonically welded together.

18. The method of claim 3, further comprising deforming the ultrasonically welded ribbon.

19. The method of claim 3, wherein the surface that a ribbon is ultrasonically welded to is the inner wall of a pipe, and wherein the metallic glass-based material is characterized by a reduced coefficient of friction relative to the inner wall of the pipe.

20. The method of claim 3, wherein the metallic glass-based material includes a precious metal.

21. The method of claim 20, wherein the precious metal is one of gold, silver, platinum, ruthenium, rhodium, palladium, osmium, iridium, and combinations thereof.

22. The method of claim 21, wherein each of a plurality of ribbons is ultrasonically welded to a surface, such that the aggregate of each of the plurality of ribbons forms a piece of jewelry.

23. The method of claim 22, wherein the formed piece of jewelry includes greater than approximately 90% precious metal, as measured by mass.

24. The method of claim 22, wherein the formed piece of jewelry includes greater than approximately 90% precious metal, as measured by atomic ratio.

25. The method of claim 22, wherein the formed piece of jewelry includes greater than approximately 95% precious metal, as measured by mass.

26. The method of claim 22, wherein the formed piece of jewelry includes greater than approximately 95% precious metal, as measured by atomic ratio.

* * * * *